(12) United States Patent
Fried et al.

(10) Patent No.: US 6,589,470 B2
(45) Date of Patent: Jul. 8, 2003

(54) PROCESS FOR PRODUCING MOLDED PLASTIC ARTICLES

(76) Inventors: Robert P. Fried, R.R. 1, Box 93, Staatsburg, NY (US) 12580; Bernard Rottman, 155A N. Quaker La., Staatsburg, NY (US) 12580

( * ) Notice: Subject to any disclaimer, the term of this patent is extended or adjusted under 35 U.S.C. 154(b) by 0 days.

(21) Appl. No.: 09/854,378

(22) Filed: May 11, 2001

(65) Prior Publication Data

US 2001/0020757 A1 Sep. 13, 2001

Related U.S. Application Data

(62) Division of application No. 09/299,133, filed on Apr. 26, 1999, now abandoned.

(51) Int. Cl.$^7$ .......................... B29C 41/04; B29C 41/46
(52) U.S. Cl. .......................... 264/443; 264/71; 264/72; 264/102; 264/302; 264/310; 425/384; 425/403; 425/434; 425/435; 425/457
(58) Field of Search ................................ 264/443, 301, 264/302, 309, 310, 311, DIG. 60, 71, 72, 101–102; 425/434, 435, 403, 384, 457

(56) References Cited

U.S. PATENT DOCUMENTS

| | | | | |
|---|---|---|---|---|
| 3,692,457 A | * | 9/1972 | Pekor | 425/435 |
| 3,728,429 A | * | 4/1973 | Colby et al. | 264/302 |
| 4,102,964 A | * | 7/1978 | Ridgeway | 264/92 |
| 4,431,397 A | | 2/1984 | Fried et al. | 425/384 |
| 4,552,715 A | * | 11/1985 | Ando et al. | 264/309 |
| 4,606,868 A | * | 8/1986 | Christoph et al. | 264/40.4 |
| 4,623,503 A | * | 11/1986 | Anestis et al. | 264/302 |
| 4,664,864 A | * | 5/1987 | Wersosky | 264/301 |
| 4,687,531 A | * | 8/1987 | Potocsky | 156/245 |
| 4,740,337 A | * | 4/1988 | Gale et al. | 264/40.6 |
| 4,755,333 A | * | 7/1988 | Gray | 264/40.4 |
| 4,776,996 A | * | 10/1988 | Ashton et al. | 264/40.1 |
| 4,790,510 A | * | 12/1988 | Takamatsu et al. | 249/117 |
| 4,851,177 A | * | 7/1989 | Gray | 264/297.6 |
| 4,898,697 A | * | 2/1990 | Horton | 264/302 |
| 4,900,489 A | * | 2/1990 | Nagase et al. | 264/46.5 |
| 5,093,066 A | * | 3/1992 | Batchelder et al. | 264/245 |
| 5,106,285 A | * | 4/1992 | Preston | 425/144 |
| 5,221,539 A | * | 6/1993 | Pallerberg et al. | 425/144 |
| 5,316,715 A | * | 5/1994 | Gray | 264/245 |
| 5,322,654 A | * | 6/1994 | Crawford et al. | 264/40.1 |
| 5,374,180 A | * | 12/1994 | Bauer | 425/429 |
| 5,868,979 A | * | 2/1999 | Glenn | 264/40.6 |
| 6,036,897 A | * | 3/2000 | Nugent | 264/40.6 |

\* cited by examiner

Primary Examiner—Stefan Staicovici
(74) Attorney, Agent, or Firm—Milde & Hoffberg, LLP

(57) ABSTRACT

A process for forming molded articles from particulate thermoplastic material, the process comprising:
(a) providing a track having a plurality of process stations,
(b) providing a mold assembly comprising a base, at least one hollow mold upstanding from the base, and guide means on the base for moving the mold assembly on the track,
(c) preheating the mold assembly at a preheat station on the track,
(d) moving the mold assembly from the preheat station to a transfer station on the track,
(e) transferring the mold assembly from the transfer station to a molding station,
(f) forming the molded articles by fusing particulate material to the at least one mold at the molding station,
(g) transferring the mold assembly with the molded articles thereon from the molding station back to the transfer station,
(h) moving the mold assembly from the transfer station to a cooling station on the track,
(i) moving the mold assembly from the cooling station to an unloading station on the track,
(j) removing the molded articles from the at least one mold at the unloading station, and
(k) moving the mold assembly from the unloading station to the preheat station.

7 Claims, 15 Drawing Sheets

PROCESS FOR PRODUCING MOLDED PLASTIC ARTICLES

CROSS-REFERENCE TO RELATED APPLICATION

This application is a divisional application of U.S. patent application Ser. No. 09/299,133, filed Apr. 26, 1999, now abandoned.

BACKGROUND OF THE INVENTION

The present invention relates to an improved process and apparatus for molding plastic articles from particulate thermoplastic material.

There are various techniques for molding plastic articles known in the art, each of which has its own particular advantages and disadvantages. The most common of these techniques is injection molding, wherein liquid plastic is injected into a mold and subsequently cooled. While injection molding is the least expensive process available for forming plastic articles in large quantity, the high cost of producing an injection mold makes its use for low volume work prohibitively expensive. In addition, the injection mold must be quickly cooled to permit its repetitive use at high volume, and that rapid cooling creates stresses within the plastic article that may result in cracks.

Another technique for producing molded plastic articles is called thermoforming. In this process, a plastic sheet is heated and stretched onto a mold. While thermoforming is exceptionally useful for shallow articles, plastic articles of any substantial depth made by that process exhibit internal stresses and weaknesses which may result in cracks. In addition, the sheet plastic used as the raw material is somewhat more expensive than the pellets or powder used in injection molding.

A still further technique for producing molded plastic articles is known as rotational molding. In this process, a fixed charge of plastic is placed within a female mold, and the mold is rotated. During rotation, heat is applied to the outside of the mold to cause the plastic to melt. With this process, energy use is relatively high and the mold is expensive to produce. In addition, the plastic article, although smooth on the outside which contacts the mold, may have a relatively rough surface on the inside. Such a rough surface is a disadvantage when the article is to be used as a container.

The present invention is an improvement of the molding process and apparatus described in the U.S. Pat. No. 4,431,397, granted Feb. 14, 1984, the disclosure of which is incorporated herein by reference. According to this patent, plastic molded articles are formed by surrounding a hollow heat-conductive mold with particulate thermoplastic material. Heat is applied to the interior of the mold until the temperature of the outer surface is above the fusion temperature of the particulate thermoplastic material. This temperature is maintained until an article of desired thickness is formed. Thereafter, loose particulate material is removed from the outer surface of the molded article and heat is again applied to the interior of the mold so as to cause the outer surface of the molded article to become smoother. Finally, the article and mold are cooled and the article is removed from the mold. This molding process will hereinafter be referred to as UNIFUSE™ molding.

SUMMARY OF THE INVENTION

It is an object of the present invention to provide an improved process and apparatus for forming plastic molded articles for which the tooling cost for molds is lower than for other plastic molding processes known in the art.

It is an object of the present invention to provide an improved process and apparatus for forming plastic molded articles which uses multiple processing stations in order to speed up the molding process and to increase the throughput per unit time of molding operation.

It is a further object of the present invention to provide an improved process and apparatus for forming molded plastic articles which requires a minimum of capital expenditure for a complete molding production system.

It is a further object of the present invention to provide an improved process and apparatus for forming molded plastic articles which permit the wall thickness of each article to be controlled within fine tolerances.

It is a further object of the present invention to provide an improved process and apparatus for forming molded plastic articles such that the articles exhibit very little internal stress.

It is a further object of the present invention to provide an improved process and apparatus for forming very large, relatively stress-free molded plastic articles such as whole vessel or vehicle bodies or substantial parts thereof.

These objects, as well as other objects which will become apparent from the discussion that follows, are achieved, according to the present invention, by means of an improved UNIFUSE™ process for forming one or more molded articles from particulate thermoplastic material, which process comprises the steps of:

(a) providing a track having a plurality of process stations, (b) providing a mold assembly comprising a base, at least one hollow mold upstanding from the base, and guide means on the base for moving the mold assembly on the track, (c) preheating the mold assembly at a preheat station on the track, (d) moving the mold assembly from the preheat station to a transfer station on the track, (e) transferring the mold assembly from the transfer station to a molding station, (f) forming the molded article(s) by fusing particulate material to the hollow mold at the molding station, (g) transferring the mold assembly with the molded article(s) thereon from the molding station back to the transfer station, (h) moving the mold assembly from the transfer station to a cooling station on the track, (i) moving the mold assembly from the cooling station to an unloading station on the track, (j) removing the molded article(s) from the hollow mold at the unloading station, and (k) moving the mold assembly from the unloading station to the preheat station again.

This process lends itself to an extremely low tooling cost for each different article to be formed. The heat conductive mold may be formed of sheet material which is welded together and sanded smooth. Aircraft quality aluminum, or aluminum with no pinholes, is the preferred material although other heat-conductive materials may also be used for the mold.

Because of the single surface molds and zero pressure used in the process of the invention, tools for the process can be made more rapidly and at lower cost than for any other molding process. Also, because most molds are made out of aluminum sheet metal, molds can be changed or modified by laser cutting out a section and welding in a new section.

The process of the invention does not require draft or tapered molds. The taper that is essential in other processes is also helpful for easier ejection, but is not essential to the process. Female molds shrink away allowing ejection. For male molds the draft parts can be ejected mechanically or by air. For air ejection, a poppet value is inserted in the mold, which can be connected to an air line. Air pressure of approximately 2 lbs. per square inch will normally slightly bubble the top of the part and the shrinkage onto the male mold sides prevents the air from escaping. When the linear shrinkage on the sides breaks the friction, the part lifts off the mold.

Because no stresses appear in the material as the article is forming, internal stresses do not develop unless the article is cooled quickly. The wall thickness of the molded article formed by this process may be precisely controlled by controlling the time during which heat is applied to fuse the particulate thermoplastic material together.

Further, articles of practically any desired size may be produced, from small cups or corrugated sheet to large panels or sections of motor vehicle bodies.

Finally, the cost of the apparatus according to the invention for carrying out the process is extremely modest in comparison with the capital investment required to purchase apparatus to carry out other known plastic molding processes.

For a better understanding of the invention, together with other and further objects, reference is made to the following description, taken in conjunction with the accompanying drawings.

PREFERRED EMBODIMENTS OF THE INVENTION

Figure 1:
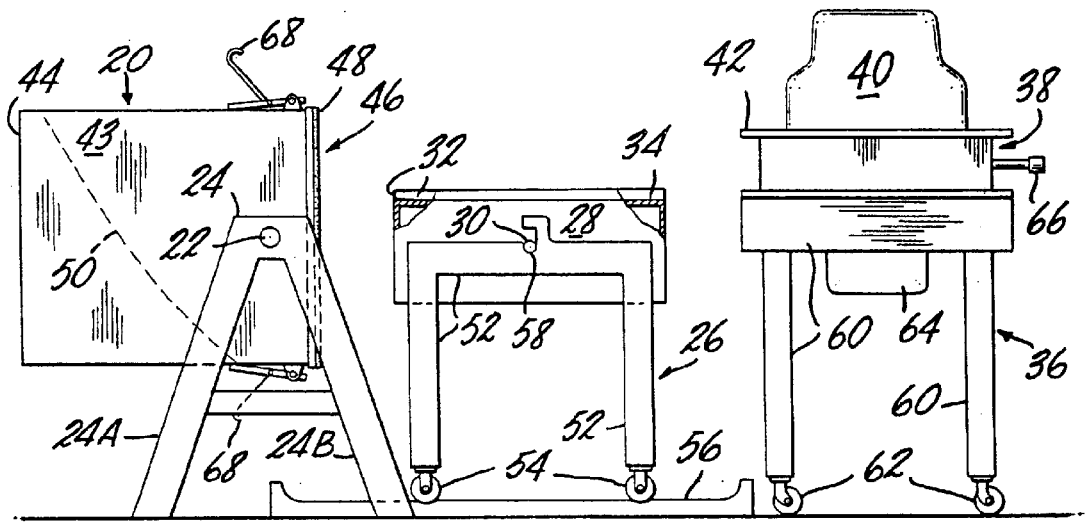
FIG. 1 is a side elevational view of one embodiment of apparatus, according to the UNIFUSE™ process, for forming molded plastic articles from particulate thermoplastic material.

The preferred embodiments of the present invention will now be described with reference to FIGS. 1–26. Corresponding elements in the various figures are designated with the same reference numerals.

Before considering the present invention in detail, it is useful to describe and understand the basic UNIFUSE™ plastic molding process and apparatus. Set forth below are excerpts from the aforementioned U.S. Pat. No. 4,431,397.

FIG. 1 illustrates the essential elements of the plastic molding apparatus according to the present invention. This apparatus includes an enclosure or container 20 pivotally mounted by means of shafts 22, extending from its opposite sides, on a frame 24 having legs 24A and 24B. A first transport unit 26 carries a "heat box" 28, which will be described in detail below. The heat box 28 is removably and pivotally mounted on the transport unit 26 by shaft ends 30 extending from its opposite sides. U-shaped guide members 32 are welded around three sides of the upper surface of the heat box 28, as shown in cross section in the upper left-hand corner, leaving open the side 34 directed toward the right, in the figure, as shown in cross section in the upper right hand corner.

A second transport unit or dolly 36 carries a mold platen 38 and a hollow male mold 40. The mold platen 38 has a lower plate 41 which is dimensioned to engage the U-shaped guides 32 on the heat box 28 and an upper flange 42 which extends outward for the base of the mold.

The pivoted container 20 is preferably a rectangular structure made of a relatively strong, non-heat conductive material such as wood or a laminate formed of sheet metal and heat insulation. The container 20 is formed by four side walls 43 and a rear wall 44, thereby leaving a front opening 46. A strip of resilient material 48 is disposed on the face edges of the front opening of the container for forming a leakproof seal with the flange 42 when the mold 40 is inserted into the front opening. The container is loaded with particulate thermoplastic material, the surface of which is indicated by the dashed line 50.

The first transport unit 26 comprises a frame 52 having wheels 54 arranged to roll on a track 56 fixed to the floor. The frame 52 has a recess 58 on each side to accommodate the pivot shaft ends 30.

The second transport unit 36 comprises a frame 60 arranged on caster wheels 62. The platen 38 is placed on top of the frame 60 and supports the hollow male mold 40. A cooling air fan is arranged in a housing 64 at the lower side of the frame 60 for cooling the mold in a manner to be described in detail below. An air inlet 66, which extends from the platen 38, serves for air ejection of the plastic molded article from the mold 40, as will be explained in detail below. The mold itself is preferably made of heat-conductive material, such as aluminum, and has an outer surface configuration correspond to the desired inner surface configuration of the article to be molded. FIG. 1 shows a typical mold for a rectangular stepped container.

Figure 2A:
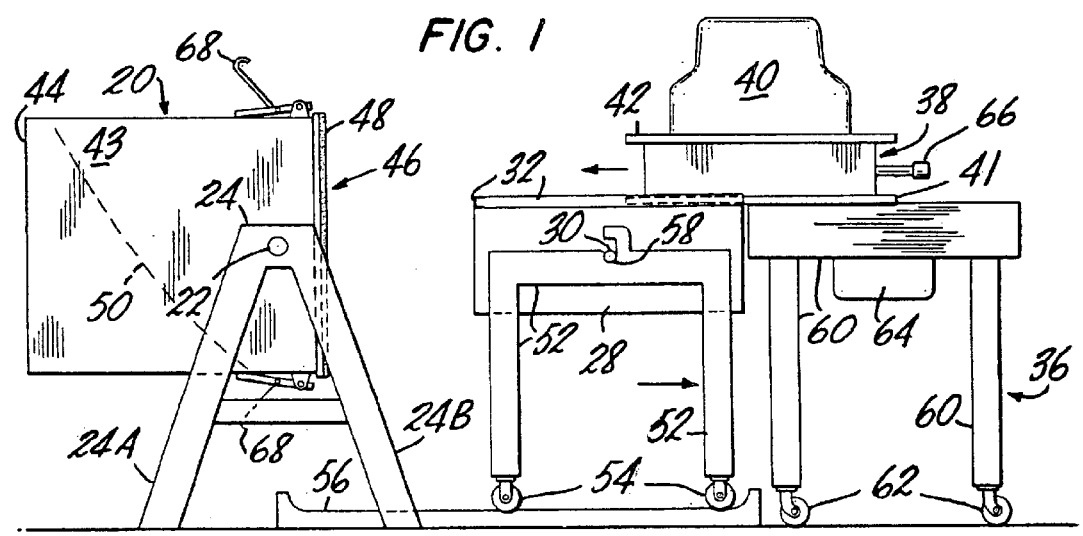
FIGS. 2A–2H are side elevational views of the apparatus of FIG. 1 illustrating how this apparatus is used for the UNIFUSE™ molding process.
Figure 2B:
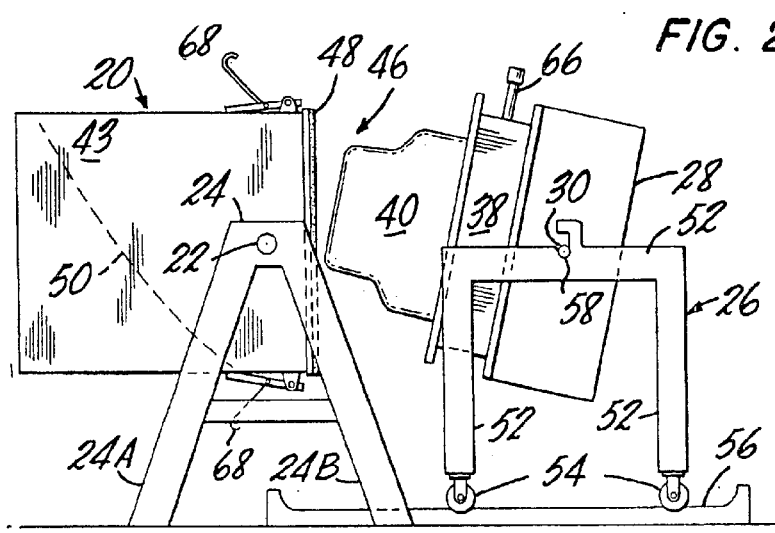
Figure 2C:
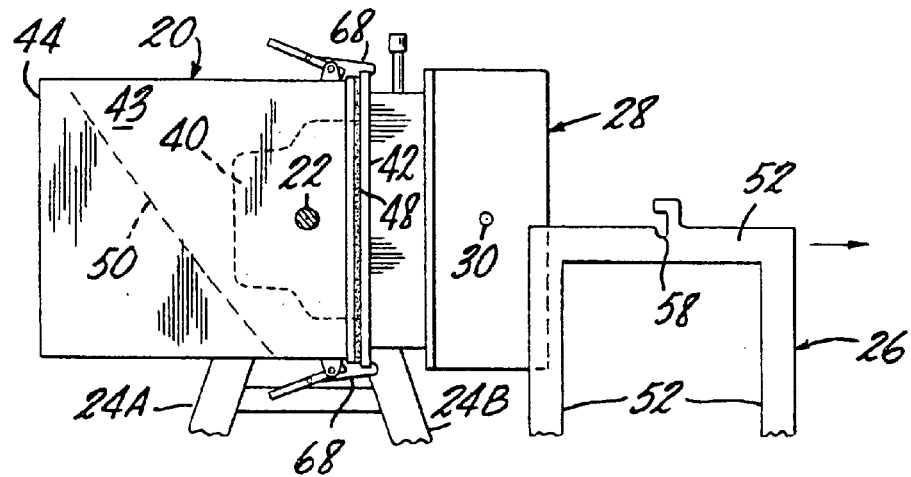

The operation of the plastic molding apparatus will now be described with reference to FIGS. 2A–2H. As shown in FIG. 2A, the mold 40 and platen 38 are slid together from the transport unit 36 onto the heat box 28 until the lower plate 41 engages the U-shaped guides 32 on all three sides. Thereafter, as shown in FIG. 2B, the heat box 28, with the platen 38 and mold 40 are pivoted together to arrange the mold in alignment with the opening 46 of the container 20. The transport unit 26 is then moved toward the left along the track 56 to bring the mold 40 inside the container 20. As shown in FIG. 2C, the flange 42 at the base of the mold 40 is brought into flat engagement with the sealing strip 48 and the entire heat box, platen and mold combination are attached to the container 20 by clamping hooks 68. The transport unit 26 is then rolled away from the assembled apparatus to permit rotation of the container.

Figure 2D:
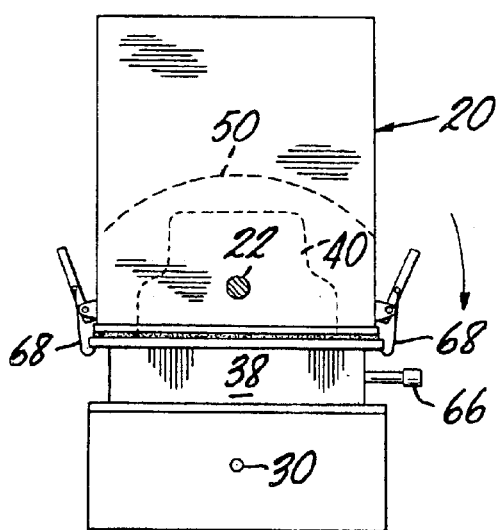

The combined heat box, platen, mold and container are next rotated through a 90° arc about the pivot shafts 22 so that the opening 46 and mold 40 are at the bottom of the container 20, as shown in FIG. 2D. The particulate thermoplastic material indicated by the dashed lines 50 then falls by gravity toward the opening 46 of the container 20 and surrounds the mold 40. At this point, heat is applied to the inside surface of the mold 40 from the heat box 28, in a manner to be described below. The application of heat causes a layer of the particulate material to fuse together and attach itself to the outside surface of the mold 40.

Figure 2E:
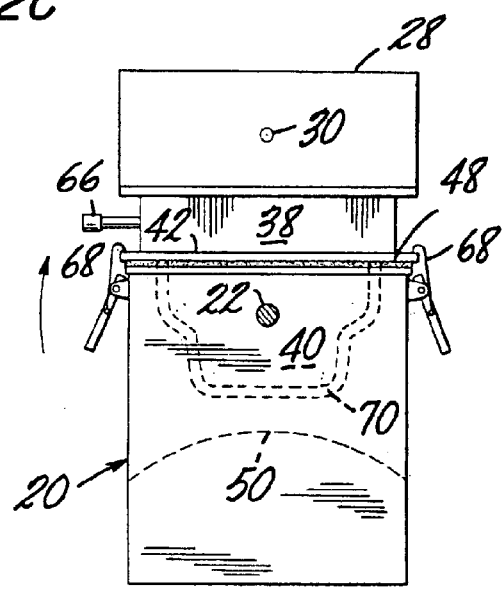
Figure 2F:
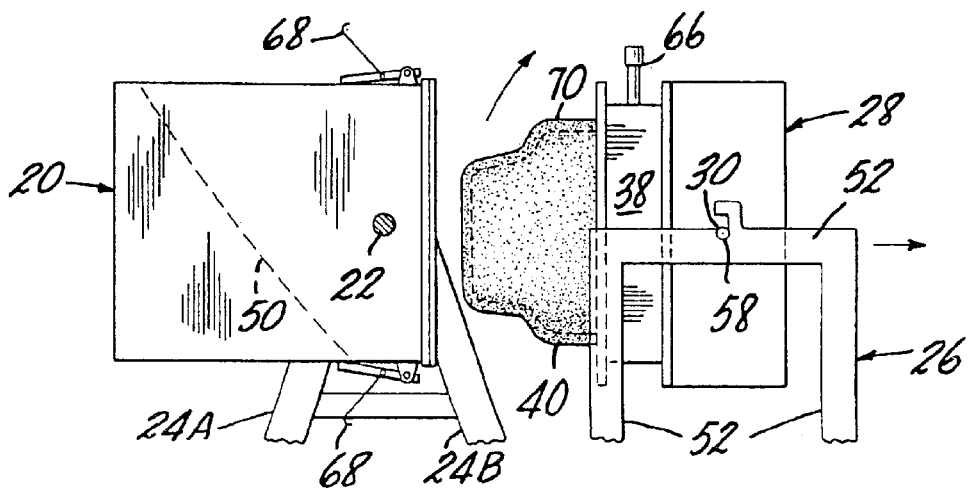

Following the application of heat for the desired time, in accordance with the guidelines set forth below, the combined heat box, platen, mold and container are rotated together through a 180° arc about the shafts 22, as shown in FIG. 2E. This movement causes that portion of the thermoplastic particulate material which has not become fused to fall toward what is now the bottom of the container 20, revealing a fused layer 70 of thermoplastic material on the mold 40 having an inner configuration which corresponds to the configuration of the outer surface of the mold. At this point, heat is applied for a shorter period of time so as to "fuse out" the outside surface of the fused thermoplastic material, allowing it to become smoother. Following the fusing out step, the combined pivoted apparatus is rotated again through a 90° arc to return the parts to the same relative position as initially when the mold, platen and heat box were clamped to the container 20. The transport unit 26 is then brought into position so as to support the pivot shaft ends 30 on opposite sides of the heat box in the recesses 58. The clamping hooks 68 are released and the assembled mold 40, including a newly fused article 70 of plastic, the platen 38 and the heat box 28 are withdrawn away from the container 20 as shown in FIG. 2F.

The assembled mold, platen and heat box are pivoted through a 90° arc so that the mold is positioned atop the platen and heat box. The mold and platen are then moved horizontally onto the second transport unit 36, as indicated in FIG. 2G, and transport unit 36 is wheeled away from the vicinity of the container 20 and the transport unit 26 so that the mold 40 and fused article 70 may be further cooled.

Figure 2G:
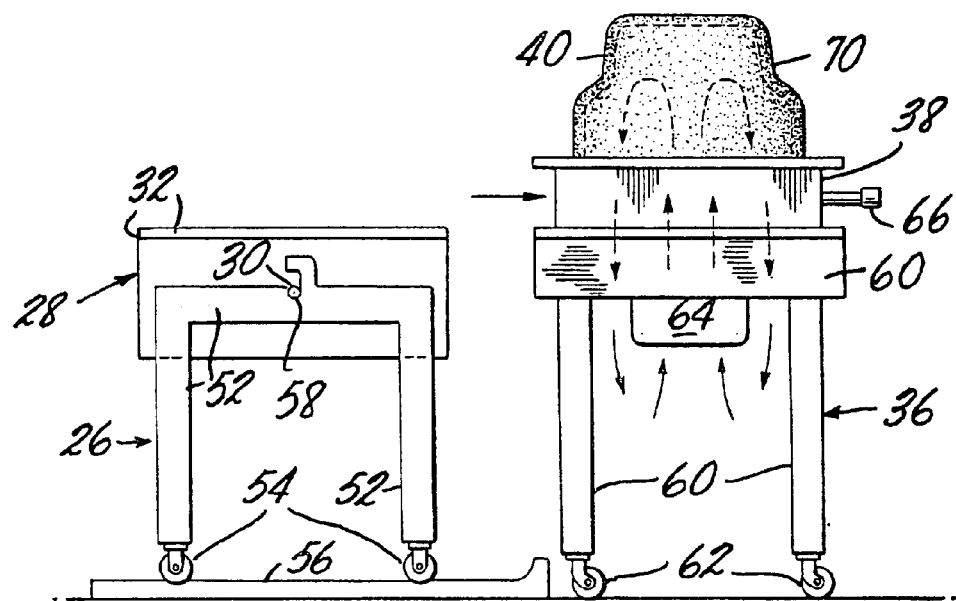

As shown in FIG. 2G, the fan in the housing 64 circulates room air upwards into the cavity of the mold 40. This air contacts the warm inner surface of mold and draws heat from the mold and from the hot thermoplastic material surrounding the mold. The fused article 70 is thereby cooled to a point a which the article may be removed from the mold.

Figure 3:
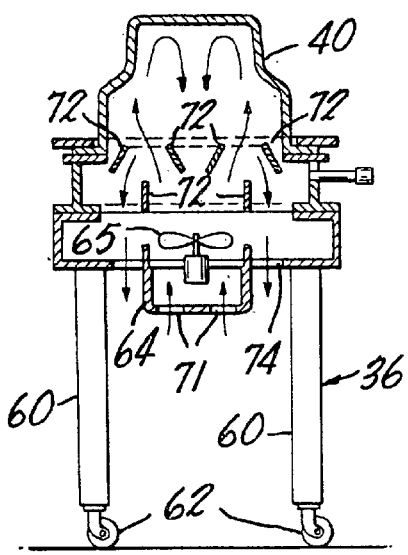
FIG. 3 is a side view of the cooling stand in FIG. 1 showing various parts in cross-section.

The circulation of air is illustrated in greater detail in FIG. 3, which shows a fan 65 located in the housing 64 at center of the transport unit 36. Openings 71 in the housing 64 permit room air to be drawn into the fan 65. The thus-propelled air is guided by baffle plates 72 in the platen 38 towards the inner surface of the mold 40, and exits through openings 74.

Figure 2H:
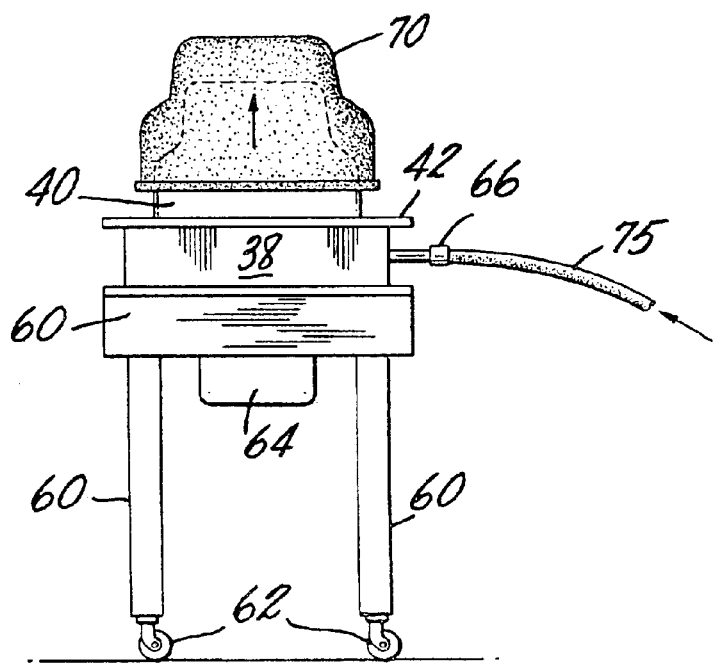

When the fused and cooled plastic article 70 is to be removed from the mold, the air inlet 66 is connected via a suitable hose 75 to a source of compressed air, or other gas. This air is directed to the outside surface of the mold, thereby lifting off the plastic article, as shown in FIG. 2H.

Figure 4:
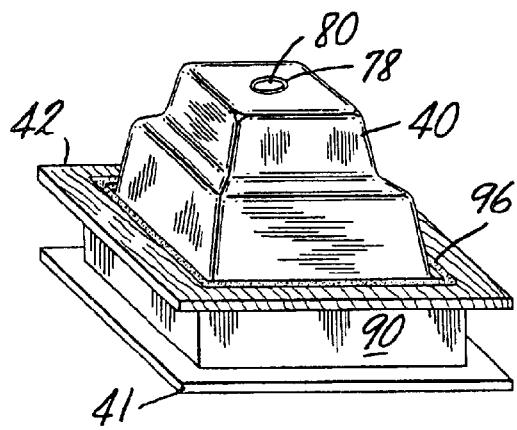
FIG. 4 is a perspective view of the mold and platen in the apparatus of FIG. 1.
Figure 5:
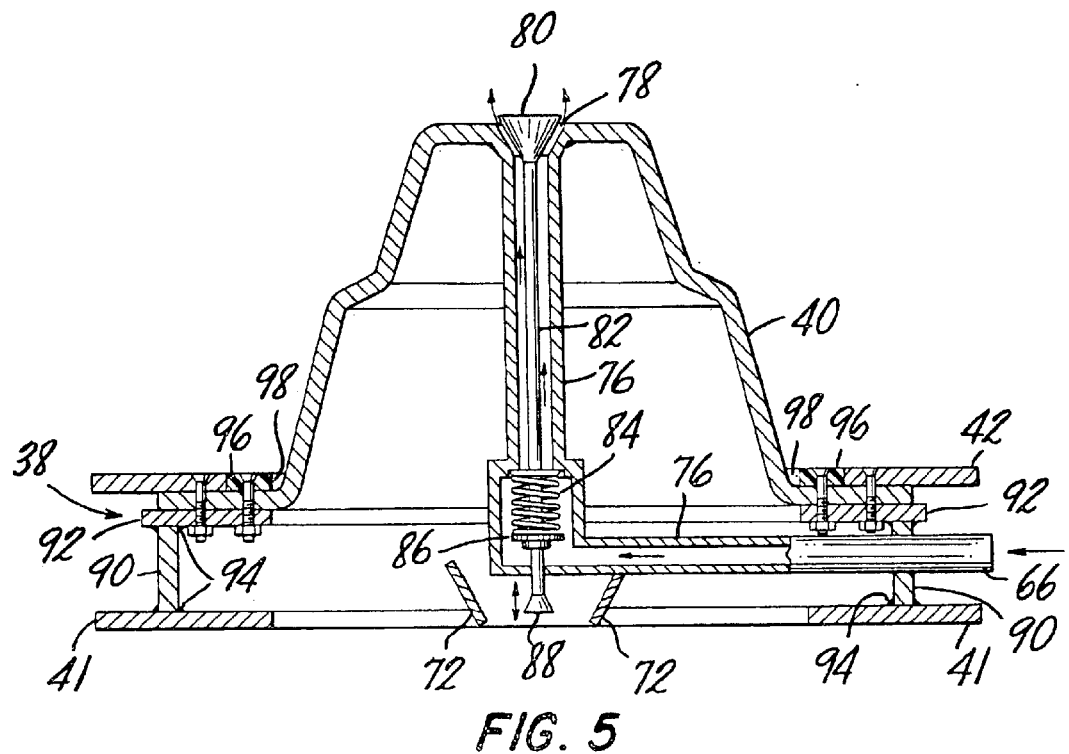
FIG. 5 is a cross-sectional view of the mold and platen of FIG. 4.

The valve apparatus within the mold 40 for applying compressed air is shown in greater detail in FIGS. 4 and 5. With reference to FIG. 5, the air inlet 66 communicates via tubes 76 with an opening 78 at the top center of the mold 40. The opening 78 is normally closed by a valve head 80, which is attached to a valve stem 82. A helical spring 84, concentric with the stem 82, acts on a valve stem plate 86 to bias the valve head 80 in a direction closing the opening 78. The application of air under pressure to the air inlet 66 overcomes the force of the spring 84, dislodges valve head 80 from the opening 78, and permits the air to enter the space between the outer surface of mold 40 and the inner surface of plastic article 70. If for some reason the valve head 80 is stuck, it may be dislodged by tapping gently with a hammer on the stem end 88.

While the valve apparatus for applying compressed air is shown in FIGS. 4 and 5 as comprising only a single opening 78 and valve head 80, it will be appreciated that air may be directed to a plurality of openings, with corresponding valve heads, located at various points on the outer surface of the mold.

The structure of the mold platen 38, and the manner in which the mold 40 is attached thereto, are also shown in FIGS. 4 and 5. As is best illustrated in FIG. 5, the platen 38 is constructed from two horizontal metal plates 41 and 92 which are separated and held in position by four vertical metal plates 90 forming a box. The plates 41, 90 and 92 are joined together by welds 94 along their edges. Both horizontal plates 41 and 92 have openings at their centers to permit air to pass freely into the interior of the mold 40.

The base of the metal mold 40 is bolted to the upper surface of the plate 92. An upper flange 42, which is made of a non-heat conductive material such as wood, surrounds the mold at some distance therefrom and is bolted to the plate 92 together with the mold base. The space between the inside edge of the upper flange 42 and the lower-most non-horizontal portion of the mold 40 is filled, in part, by a circumferential strip 96 of non-adhering material such as Teflon. This arrangement leaves a small space 98 immediately adjacent to the base of the mold 40 which may be filled with particulate material during the molding process. A sharp clean line about the open edge of the finished, molded article is created by the inner face of the strip 96 of non-adhering material.

In the alternative, it si possible to extend the upper flange 42 inward toward the mold, thereby omitting the strip 96. Any rough edges appearing on the finished molded article may be removed by cutting and/or sanding.

Figure 6:
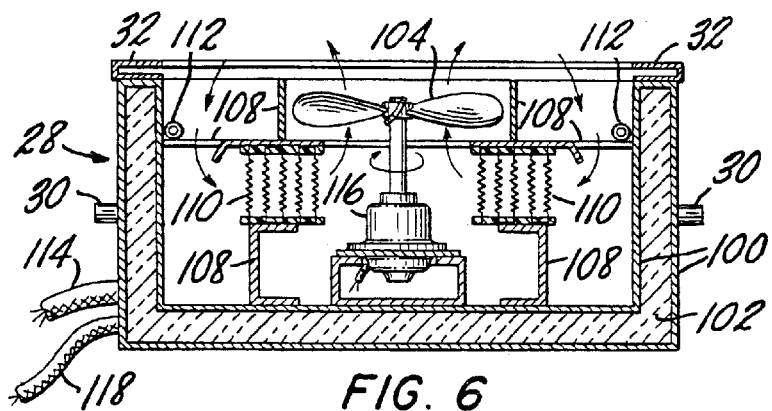
FIG. 6 is a cross-sectional view of the heat box in the apparatus of FIG. 1.

FIG. 6 shows the structure of the heat box 28 in detail. The internal and external surfaces of this box are made of metal sheet 100 which surrounds insulation 102. As mentioned previously, the upper end of the box is provided with U-shaped guides 32 for the base plate 41 of the mold platen 38. A fan 104 is centrally positioned to force air through the open face of the box, in the directions indicated by the arrows, with the assistance of baffles 108. Heating elements 110 are positioned below the blades of a fan 104 so that the fan forces heated air up into the interior of the mold 40 when the mold is positioned above the open face of the heat box. These heating elements are controlled by thermocouples 112 arranged in the path of air flowing through the box. Electrical leads 114 supply power to the fan motor 116 and to the heating elements 110. Another cable 118 carries control signals from the thermocouples 112.

The electric circuit for the heat box 28 is connected to operate as follows: Electrical power is supplied to the fan motor 116 through a timer which turns the motor on during the precise periods that heat is to be applied to the mold. The heating elements 110 are separately connected to the power source when the fan is on through switches controlled by the thermocouples 112. When rapid heating of the mold 40 is desired, as when the mold has first been inserted into the container 20, power is applied to all of the heating elements. When the air circulating through the heat box reaches a first temperature determined by one thermocouple, some of the heating elements (for example, one-half of these elements) are disconnected from the power source while the remaining elements are left connected. If and when the air circulating through the heat box reaches a second, higher temperature determined by the other thermocouple, the power is disconnected from all of the heating elements. Thus, the two thermocouples 112 are each set to respond at one of the two different temperatures, thereby providing signals on the electrical leads 118 to control the power to the heating elements 110.

Figure 7:
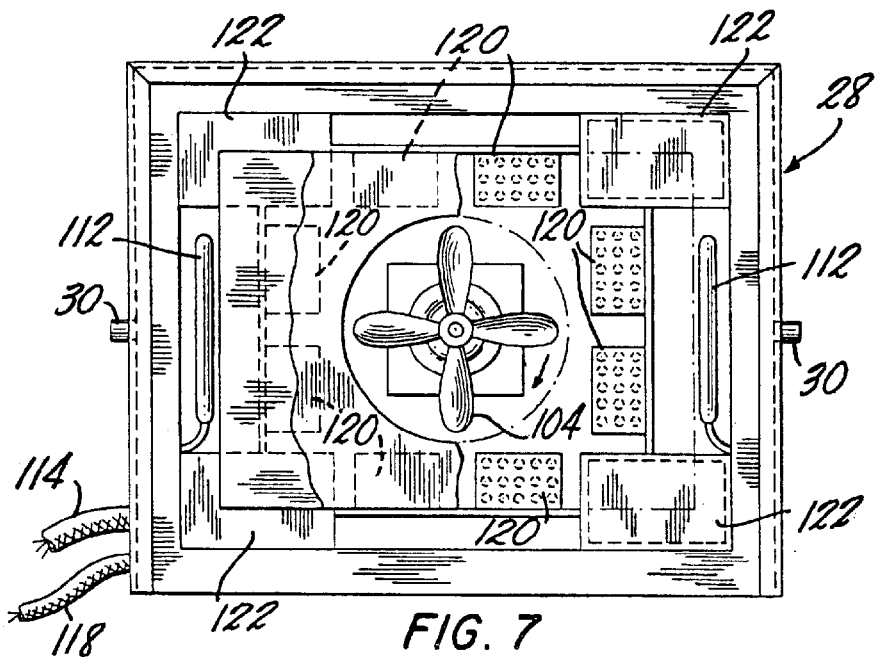
FIG. 7 is a top view of a modified form of heat box which may be used in the apparatus of FIG. 1.

While small heat boxes for small molds may be provided with heating elements arranged in only two banks on either side of the fan, as shown in FIG. 6, larger molds require correspondingly greater amounts of heat. FIG. 7 illustrates an alternative arrangement of a heat box with eight banks of heating elements 120 arranged in pairs around the fan 104. Two thermocouples 112 are provided as in the embodiment of FIG. 6, in the path of air that recirculates through the box. Rectangular posts 122 are provided at the four corners of the box so that the air is constrained to flow through the heating elements 120.

Figure 8:
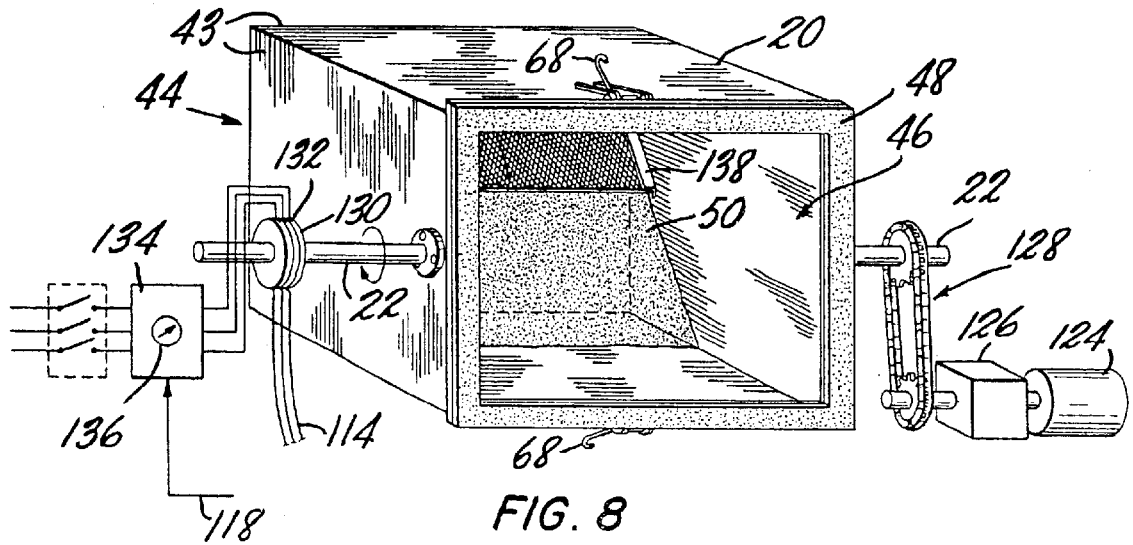
FIG. 8 is a perspective, and partly schematic illustration of the container and electric circuits for the apparatus of FIG. 1.

The container 20, and a mechanism for rotating the container is illustrated in FIG. 8. As explained above, the container has four side walls 43 and rear wall 44. The front of the container 46 is open and is provided with a resilient seal 48 made of foam rubber or cork, for example, around its face edge. Clamping hooks 68 are provided on at least two opposite sides near the front opening.

Attached to the container, and extending outwardly on opposite sides of a horizontal plane are two axially aligned shafts 22. The shafts 22 provide support for the container and permit the container to rotate in the manner described above.

Rotation of the container is effected by a motor 124, a speed-reduction gear box 126 and a chain and sprocket drive 128. Electrical power is supplied to the heat box, that rotates with the container 20, through suitable rotating collectors 130 and stationary brushes 132. The power is switched on and off by a control box 134 which contains one or more timers 136 and receives control signals from the heat box thermocouples on line 118.

The particulate thermoplastic material 50 in the container 20 is moved about within the container as it is rotated. In this embodiment the container is provided with a perforated baffle 138 which extends from one side wall to the other diagonally downward from the upper corner of the rear wall 44. Another identical baffle, which is covered by the particulate thermoplastic material 50 and is therefore not shown in FIG. 8, extends diagonally upward from the lower corner of the rear wall 44. The precise position of these two baffles 138 is shown in cross section in FIG. 9A. The purpose of the baffles 138 is to control the flow of particulate material onto the mold as the container 20 is rotated. Depending upon the type of mold, these baffles improve the distribution of the particulate material over the mold surface.

Figure 9A:
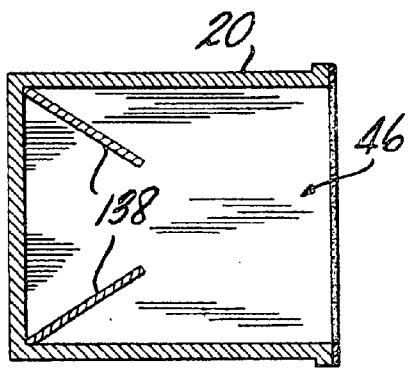
FIGS. 9A–9E are side, sectional views of a container which may be used in the apparatus of FIG. 1, showing various features and modifications.
Figure 9B:
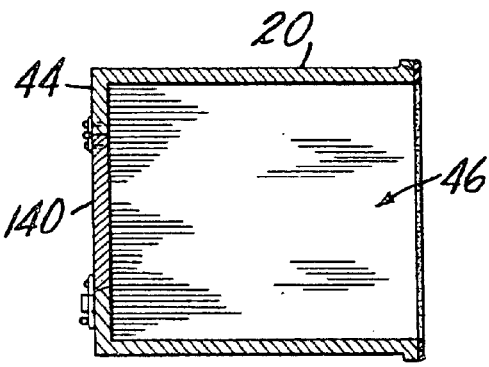

FIG. 9B shows a container 20 having a door 140 in its rear wall 44 to permit particulate thermoplastic material to be removed and inserted when the front opening 146 is closed by the mold and mold platen assembly. This permits different plastic materials to be inserted into the container without removing the mold so as to build up layers of different plastics on the mold surface, thereby forming a laminated plastic article. As an example, a plastic article which is white on the inside and black on the outside may be formed by molding first with white particulate material, replacing the white material with black material through the trap door, and then molding with the black material.

Figure 9C:
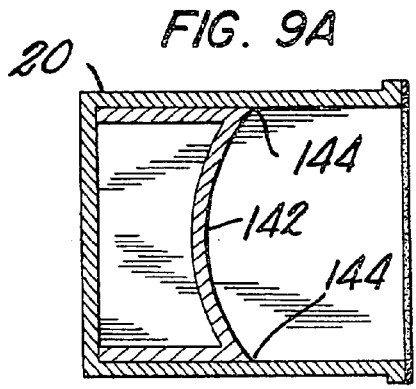

FIG. 9C shows another embodiment of the container 20 which is provided with an insert 142 removably mounted inside. This insert reduces the interior volume of the container to adjust for molds of small size. The insert 142 may be removed by detaching the latches 144 on the opposite side walls.

Figure 9D:
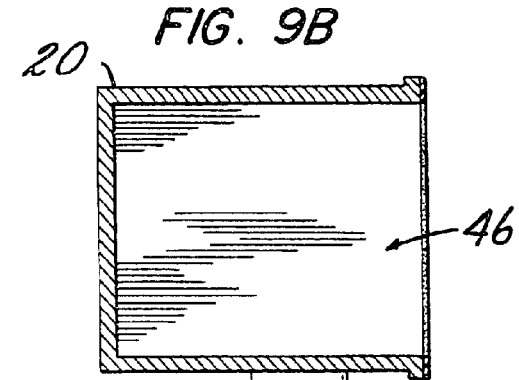

FIG. 9D shows a further embodiment of the container 20 which is provided with a vibrating mechanism 146. This mechanism 146 imparts vibrational energy to the container walls so that the particulate thermoplastic material may be agitated as it settles over the mold. Such vibration causes the material to evenly surround the mold and is particularly advantageous when the mold surface includes indentation or projections.

Figure 9E:
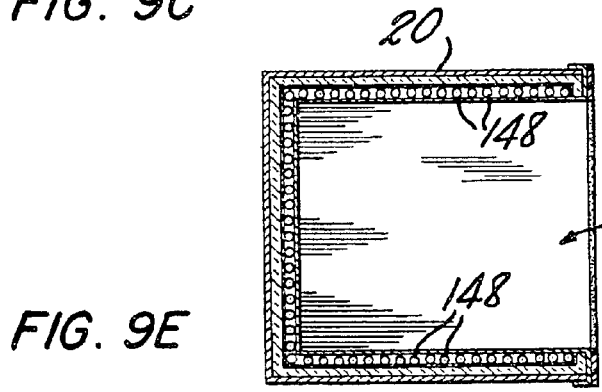

FIG. 9E shows an embodiment of the container 20 which is provided with heating coils 148 adjacent its inner surface.

These coils may be constructed as tubes that carry a hot liquid, hot oil or gas, such as steam, or they may simply be electrical heating elements connected to a suitable power source. While the container may be made of wood or some other insulating sheet material, it may also be constructed as a laminate with separate insulation as shown in the figure. The application of heat to the container makes it possible to maintain the particulate thermoplastic material within the container at a temperature close to the fusing temperature to reduce the heating time when the mold is inserted.

Figure 9F:
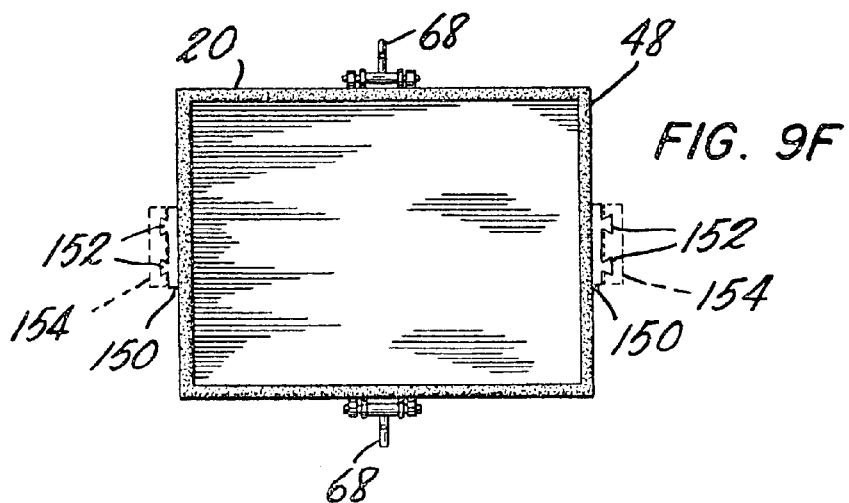
FIG. 9F is a front view of a container which may be used in the apparatus of FIG. 1 having guide plates for aligning the mold.

FIG. 9F shows another embodiment of the container 20, this time in front view. The figure shows the seal 48 and two clamping hooks 68. As is indicated also in FIG. 8, the clamping hooks each comprises a handle pivotally mounted on a side wall of the container 20 adjacent to the front opening 46 and a hook member pivotally attached to the handle between the handle ends. Also shown n FIG. 9F are guide plates 150, attached to opposite walls of the container, for aligning the mold platen with the container. The guide plates 150 are each provided with ribs 152 extending in dashed lines in FIG. 9F, are provided on the mold platen and extend forward to engage the guide plates 150 as the mold is inserted into the container.

The mold 40, which may assume virtually any configuration, is preferably made of welded aluminum due to its strength and high heat conductivity. However, any other metal, both sheet metal and cast metal may be used. In fact, thermosetting plastic, although not nearly as heat conductive as metal, may be also used to form the mold.

Figure 10A:
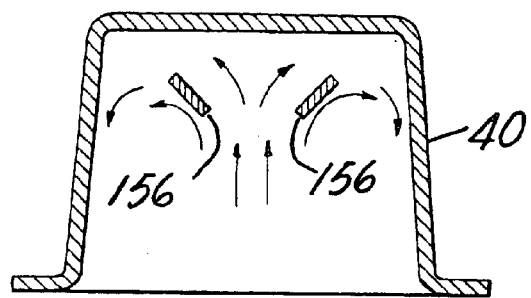
FIGS. 10A–10C are cross-sectional views through various molds which may be used with the apparatus of FIG. 1.

FIG. 10A illustrates one mold in cross section having internal baffles 156 to direct the heated air towards specific areas, such as the corners of the mold. By means of such baffles, it is possible to "place" the heat and thereby control the thickness of the finished plastic article at specific locations.

Figure 10B:
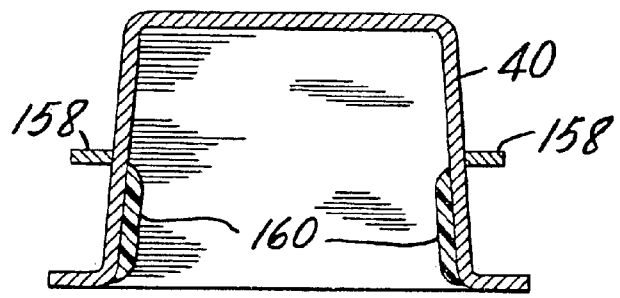

FIG. 10B shows a mold 40 with an adjustable flange ring 158 temporarily welded at a desired height on the sides of the mold. With such a flange, it is possible to produce plastic molded articles of any prescribed depth using a single original mold. Heat insulation 160 may be provided on the inner and/or outer surface of the mold so that heat is preferentially placed where the molded article is to be formed.

Figure 10C:
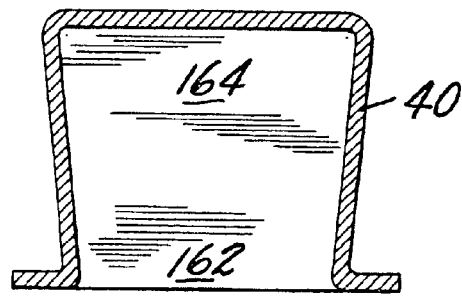

FIG. 10C shows a male 40 for a container which will have, when molded, a narrowed neck portion and an enlarged bottom portion corresponding to the regions 162 and 164 of the mold, respectively. This mold configuration is typical of may types of male molds having shaped sides which would not permit a plastic molded article, when formed, to simply slide off the top of the mold. Other mold configurations which present this same problem are those having an inwardly extending recess, at the base for example, or outwardly extending projections along the mold sides.

Figure 11A:
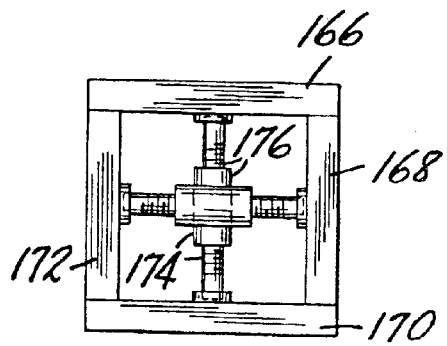
FIGS. 11A and 11B are bottom views of segmented, collapsible molds.
Figure 11B:
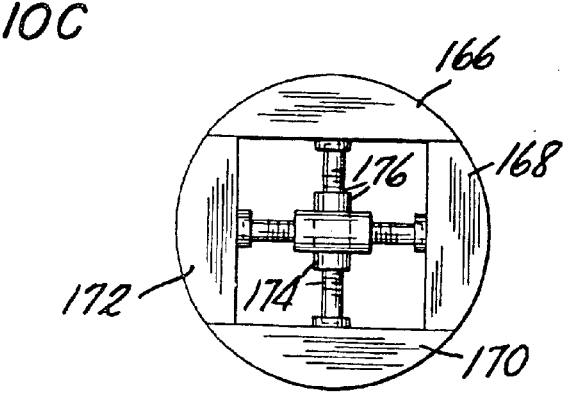

FIGS. 11A and 11B illustrate, in bottom view, rectangular and cylindrical molds, respectively, which overcome the problem of separation of the plastic molded article and the mold when the mold has a configuration of the type described above. As may be seen, the mold is formed as a collapsible, segmented unit, which may be taken apart when the molding process is complete and removed from the inside of the plastic molded article. In both the embodiments illustrated in FIG. 11A and FIG. 11B, the mold is formed of four segments 166, 168, 170 and 172, held in position, during molding, by two adjustable bars 174 and 176. When the mold is to be "collapsed", the mold segments 168 and 172 are first drawn inward, away from the inner surface of the plastic molded article, and removed from the article. Thereafter, the other two segments 166 and 170 are similarly drawn inward and removed. Consequently, the mold utilized in the practice of the present invention may assume virtually any configuration, and need not be restricted by the requirement that the plastic molded article is to be slid off the outside surface of the mold.

Figure 12:
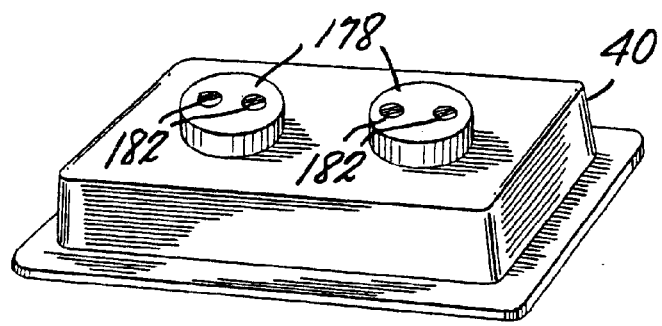
FIG. 12 is a perspective view of a mold having projections for forming openings in a molded article.
Figure 13:
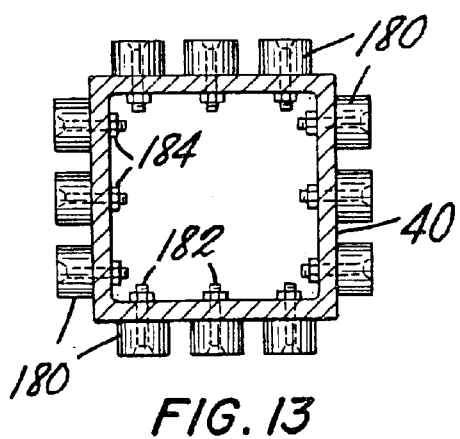
FIG. 13 is a cross-sectional view through a mold having projections for forming openings in a molded article.

FIGS. 12 and 13 illustrate how the present invention may be used to form plastic molded articles having holes or openings therein. In particular, the hollow heat conductive mold core 40 may be provided with projections of any shape, anywhere on its surface, made of non-heat conductive material such as Teflon or Nylon. While FIG. 12 shows two large projections 178, FIG. 13 shows a large number of small projections 180 arranged around the lateral sides of the mold core 40. The projections are attached to the mold core by means of bolts 182 and nuts 184 in the embodiment shown in FIG. 13. The projections must be unbolted and detached from the mold core before the plastic molded article may be removed.

Additionally, it is possible to add silicone caulking to the mold, particularly on the edges of the mold where it is attached to a wood or metal base, to prevent air leakage and outflow of plastic particles. Caulking may also be applied to the inner surface of the mold to control the heat conduction at specific points or to the outer surface to create recesses or holes in the molded articles.

Figure 14B:
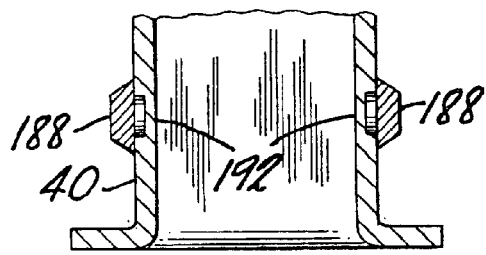
FIGS. 14A and 14B are cross-sectional views through molds having mold attachments for forming recesses in the interior surface of a molded article.
Figure 14A:
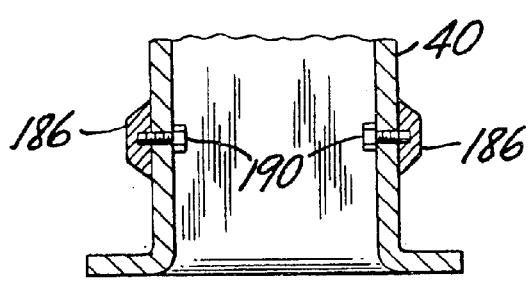

FIGS. 14A and 14B illustrate how a mold 40 may be provided with heat conductive attachments 186 and 188, respectively, for producing plastic molded articles with undercuts or recesses in their interior surface. These attachments 186 and 188 are preferably made of metal, such as aluminum or steel. They are formed in the precise shape desired for the interior surface of the molded article and attached to the mold 40 in such a way that they can be detached when the article is to be removed from the mold. In the embodiment of FIG. 14A the attachments 186 are connected to the mold by means of bolts 190 which may be removed, prior to removal of the plastic molded article, by unscrewing them from inside the mold. In the embodiment of FIG. 14B, the attachments 188 are made of magnetizable material such as iron or steel and are held in position by permanent magnets 192 embedded in the exterior surface of the mold 40. In both embodiments of FIGS. 14A and 14B, the attachments 186 and 188 are removed from the mold 40 together with the plastic molded article, and then are removed by hand from inside the article. If desired, these attachments may be allowed to remain in the plastic molded article as reinforcements.

Figure 15:
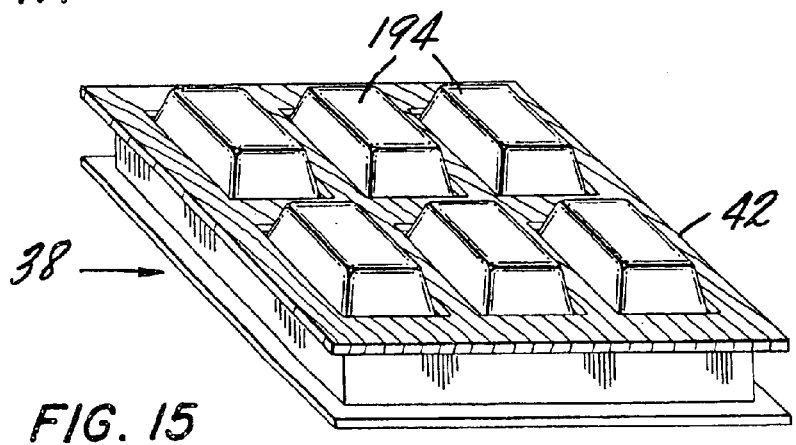
FIG. 15 is a perspective view of a plurality of molds arranged on a common platen.

FIG. 15 shows a single mold platen 38 adapted to carry a plurality of individual molds 194. A single upper flange 42 of non-heat conductive material such as wood or plastic is provided to define the areas in which the particulate thermoplastic material will be heated and fused to the individual molds. With a platen and molds of this type, a plurality of molded articles may be formed in one heating and cooling cycle. The manner of attaching the molds 194 to the platen 38 is completely analogous to the arrangement described above and illustrated in FIG. 5.

Figure 16:
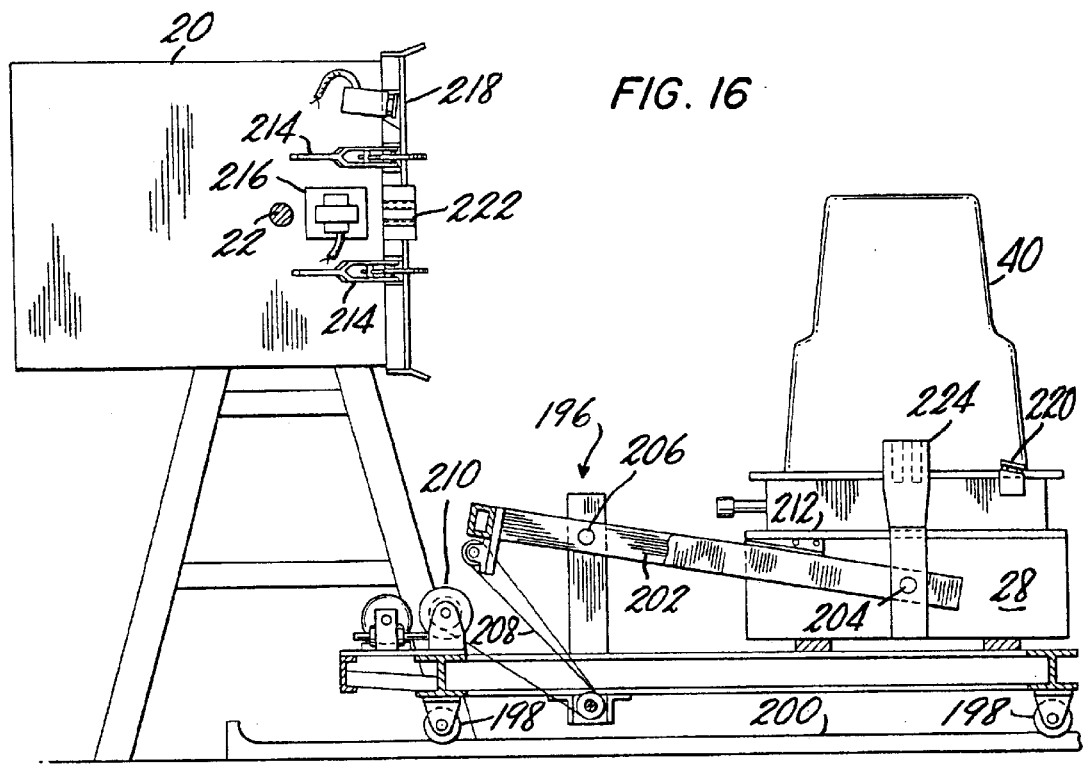
FIGS. 16 and 17 are side elevational views of another embodiment of apparatus according to the present invention for forming molded plastic articles from particulate thermoplastic material.
Figure 17:
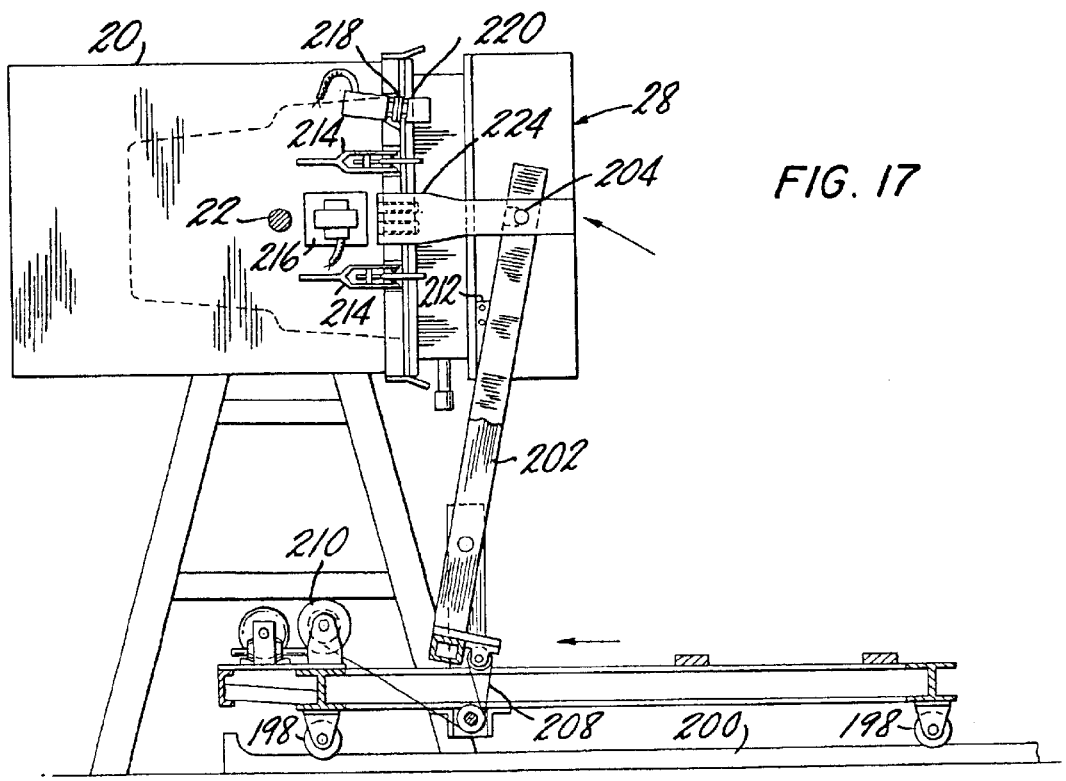

FIGS. 16 and 17 illustrate another embodiment of plastic molding apparatus according to the invention which is capable of handling large molds for forming large plastic containers and the like. For example, the mold 40 illustrated in these figures is approximately 3 feet wide and 4 feet deep. The container 20 is appropriately dimensioned to receive this mold.

In order to retain the mold 40 at a convenient height for manual transfer from a cooling dolly to the heat box 28, the heat box is carried on a transport unit 196 having wheels 198 arranged on a track 200 fixed to the floor. The transport unit is provided with a pair of support arms 202 which grasp the heat box 28 by pinions 204 on either side and raise it up to the mounting position shown in FIG. 17. The mold, mold platen and heat box combination are prevented from rotating counterclockwise by a block 212 on the side of the heat box. Once the mold, platen and heat box are clamped into position by the clamps 214, the arms 202 are lowered and the transport unit 196 is moved away.

In addition to the clamps 214, which are identical to the clamps 68 described previously, the container 20 is provided with a means 216 for imparting vibrational energy to the container; contactors 218 for supplying electrical power from the container to the heat box via mating contactors 220; and guide plates 222 on opposite sides of the type described above and shown in FIG. 9F. The guide plates 222 mate with the corresponding guide plates 224 on opposite sides of the mold.

Figure 18:
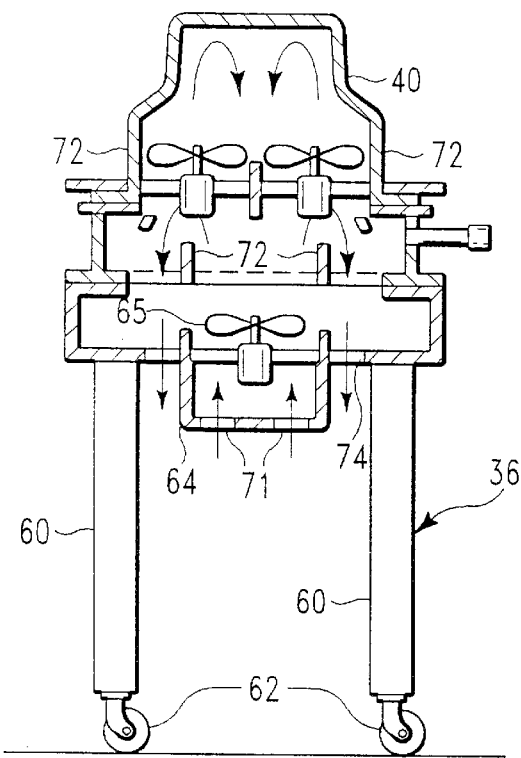
FIG. 18 is a cross-sectional view of the cooling stand, similar to FIG. 3, showing the use of multiple fans.

FIG. 18 illustrates an embodiment of the UNIFUSE™ apparatus which employs multiple fans for even heating of the mold. These fans are carefully spaced within the base to apply maximum heat to portions of the mold, such as corners and edges which require extra energy during the molding process.

The UNIFUSE™ process for forming molded articles from particulate thermoplastic material has now emerged from the above description of FIGS. 1–18. However, the parameters of this process warrant some further discussion.

The particulate thermoplastic material utilized in forming the molded article may be any thermoplastic polymer which forms a solid at room temperature. Preferred materials, and some suggested sources for these materials, are as follows:

Polyethylene—Mobil, Exxon or equivalent.

Polypropylene—Millenium or equivalent.

Polycarbonate—GE "Lexan" or equivalent.

Polyethylene terephthalate

Polyvinylidene fluoride

Polacrylates and polymethacrylates

Polysulfones

Polyamides

Polyacetals

Polyphenylene sulfides

Vinyl resins

The particle size of the thermoplastic material has a preferred upper limit of approximately 200 microns or about 0.020 inches (diameter). Larger particles result in an undesirably coarse finish on the non-mold side of the product. A particulate size of 35 mesh has been found to be optimal. The thermoplastic material preferably has a relatively low melt index because, in general, the longer the time it takes to form the plastic article, the stronger it will be. A melt index in the range of 0.5 to 20 is preferred with a melt index of 4 or 5 being optimal for most products. As explained above, the thermoplastic material surrounding the mold is heated to a temperature between the fusion and melting temperatures (its glass transition state) of the particular material used. The longer this temperature is applied to the mold while the particulate thermoplastic material surrounds the mold, the thicker the molded article will be.

Figure 19:
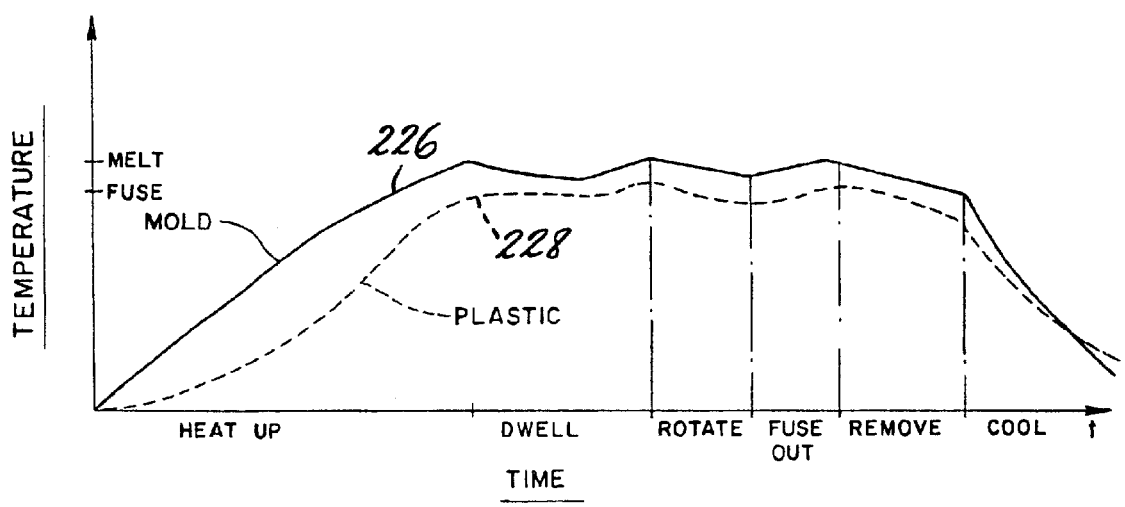
FIG. 19 is a coordinate diagram showing the time-temperature relationship in a typical UNIFUSE™ molding process.

FIG. 19 shows a time-temperature diagram for a typical molding process. In this diagram the mold temperature is indicated by a solid line 226, whereas the temperature of the thermoplastic immediately surrounding the mold is indicated by a dashed line 228. It is assumed, in the case illustrated, that the particulate thermoplastic material starts at substantially room temperature, although as has been explained above in connection with FIG. 9E, the thermoplastic material may be maintained at a temperature slightly below its fusion temperature to shorten the warm-up time.

During the initial phase, when the mold is surrounded by particulate thermoplastic material, the mold and the surrounding thermoplastic is heated rapidly to a temperature above the fusion temperature of the material. If the temperature were allowed to continue to rise to above the melting temperature of the material, the thermoplastic would turn to a liquid at the surface of the mold and flow down to the base of the mold. Consequently, it is important to maintain the temperature of the mold below the melting temperature of the thermoplastic.

After the thermoplastic has reached the desired temperature at the surface of the mold, the mold is maintained at a substantially constant temperature (usually cycling between two slightly different temperatures as described above in connection with FIGS. 6 and 7). During this "dwell" time, the particulate thermoplastic material at the surface of the mold fuses together. The longer this temperature is maintained with the particulate material surrounding the mold, the thicker the plastic article will be because the heat of the mold is conducted outward through the thermoplastic material and fuses material at an ever-increasing distance from the mold.

The temperature control is by standard temperature control units which turn the heaters on or off at preset maximum or minimum temperatures. The read out can be either of the air temperature above the heaters or by mold contact. The material can be pre-heated in order to increase molding speeds. However, this is not normally done due to the risk of operator contact with higher temperature plastics. The technique of pre-heated materials is therefore intended to be used when the process is fully automated and away from possible operator contact with hot plastic.

When the desired thickness of the article is reached, the mold is rotated to remove the loose particulate material from the fused molded article. Thereafter, the temperature is maintained on the mold to "fuse out" the article, causing the outer surface of the article to become smoother.

At this stage the still melted surface of the thermoplastic material may have applied to it a reinforcing material, e.g., fibers or mesh comprised of fiberglass, carbon, graphite, Spectra or Kevlar fibers. Heat is then preferably applied to the mold again to fuse the reinforcing material to the plastic article. Instead of, or in addition to the fibrous reinforcing material, the still melted surface of the thermoplastic material may have applied to it a plastic foam, e.g., a polypropylene sheet in the form of a thick sheet. The molded article with the reinforcing material adhered to its melted surface may then be reintroduced into the molding chamber so that more particulate thermoplastic material may be applied to cover the reinforcing material. These steps may be repeated several times in succession.

Alternatively, or in addition, the molding assembly may be introduced into a succession of molding chambers containing different thermoplastic material so that a laminate is formed in the molded article.

Finally, heat supplied to the interior of the mold is switched off and the mold, with its surrounding plastic article, is removed from the container or from the stage at which the fuse-out heat is applied. Finally, a cooling medium, such as air, is applied to the interior of the mold to rapidly cool the mold and the surrounding article. Once the article is brought down to room temperature it is removed from the mold.

Although FIG. 19 shows rapid cooling of the mold and article, internal stresses in the article may be minimized by allowing it to cool slowly. If the article is thus annealed it will exhibit no "memory", i.e., it will always return to its original shape after warping or bending.

It is possible to insert additives into the particulate thermoplastic material to achieve desired results. For example, a foaming agent such as Celogen, which is available commercially from U.S. Royal, may be added at a predetermined rate to create pores in the plastic molded article. As mentioned above, laminated articles may also be formed by carrying out the process according to the present invention using several different thermoplastic materials. For example, a thin layer of non-porous plastic may be formed on the side of the mold, followed by a layer of foamed plastic, thereby producing a light container with a non-porous interior surface. The sequential process steps of forming different layers of plastic on the mold may be carried out either by replacing material through a trap door in a single container as shown in FIG. 9B, or by successively inserting the mold in a plurality of containers, each with a different plastic material. The mold is preferably impacted with an impact mechanism after molding with each successive plastic material, to shake off the excess material from the molded article before introducing the mold into the next container.

In order to facilitate removal of the article, a non-stick coating of Teflon or silicone may be sprayed or painted onto the outer surface of the mold before it is inserted into the container. Such coatings are commercially available and are known as a "mold release".

Particularly if the mold has undercuts on its outer surface, or is otherwise not completely uniform, the mold or the container are preferably subjected to a mechanical vibration between the time that the particulate thermoplastic material is poured over the mold and the time that the heat is applied to the interior of the mold. Such vibration disperses and distributes the particulate material evenly around the mold. It has been found that mechanical, sonic or ultra sonic vibration or some combination thereof is sufficient for this purpose.

Vibration of the mold results in material distribution as well as surface heating of the particles, resulting in fusion. In the process, either the mold or the entire container and mold can be vibrated. In larger parts, combined vibration results in better results. This is due to the fact that material is in excess over the mold and in large parts (100–200 lbs.) the material load may be as high as 1 ton (2,000 lbs.). The high loads seem to distribute better when the container and mold are vibrated.

An example of the production of a plastic molded article in accordance with the UNIFUSE™ process is as follows:

Medium density polyethylene in a 35 micron powder with a melt index of approximately 1.5 to 2 is placed in the container. The mold is inserted and heat is applied for approximately 10 minutes to raise its temperature to 300° F. Thereafter, the temperature is maintained at 300° F. for approximately 3 minutes ("dwell"), depending upon the desired product size, shape and thickness. The container and the mold are then rotated to remove the loose material from the mold. Thereafter, the temperature is maintained at 300° F. for 3–5 minutes to allow the outer surface of the article to "fuse out".

The mold with the fused article is removed from the container and rapidly cooled by directing air at room temperature against the inner surface of the mold. Finally, the article is removed from the mold and sanded, where necessary, to eliminate rough edges.

Figure 22:
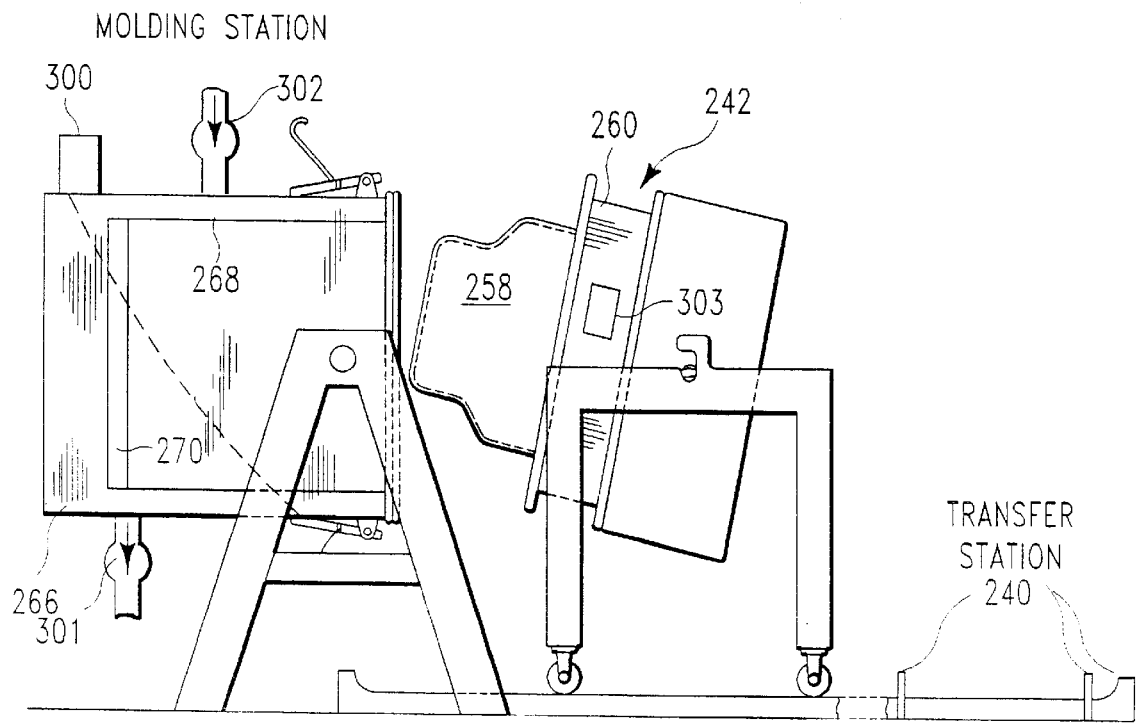
FIG. 22 is a side elevational view of the track of the transfer station and molding station in the apparatus of FIG. 20.
Figure 20:
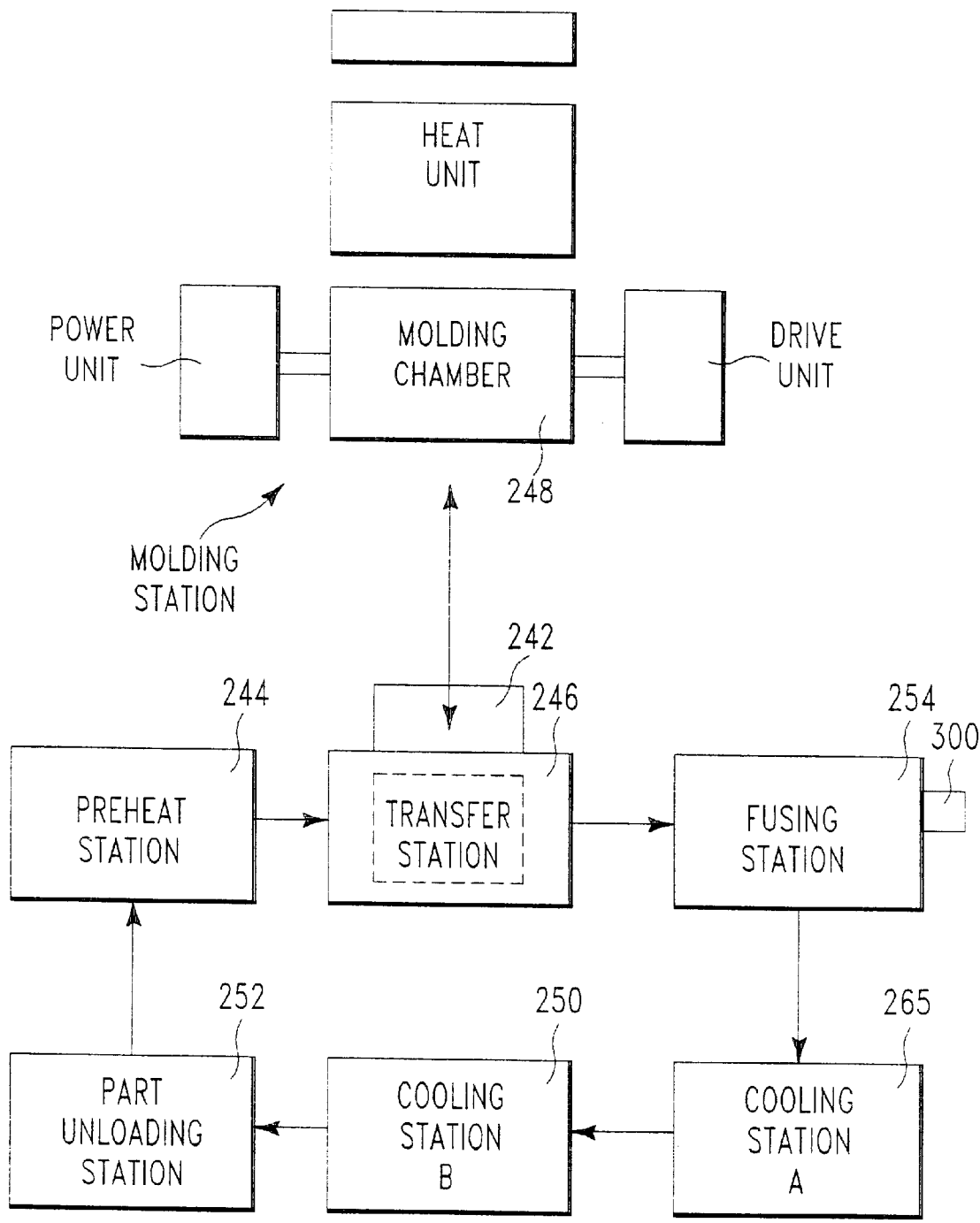
FIG. 20 is a schematic top view of apparatus for carrying out the improved UNIFUSE™ process according to the invention, showing the various operating stations in position.
Figure 21:
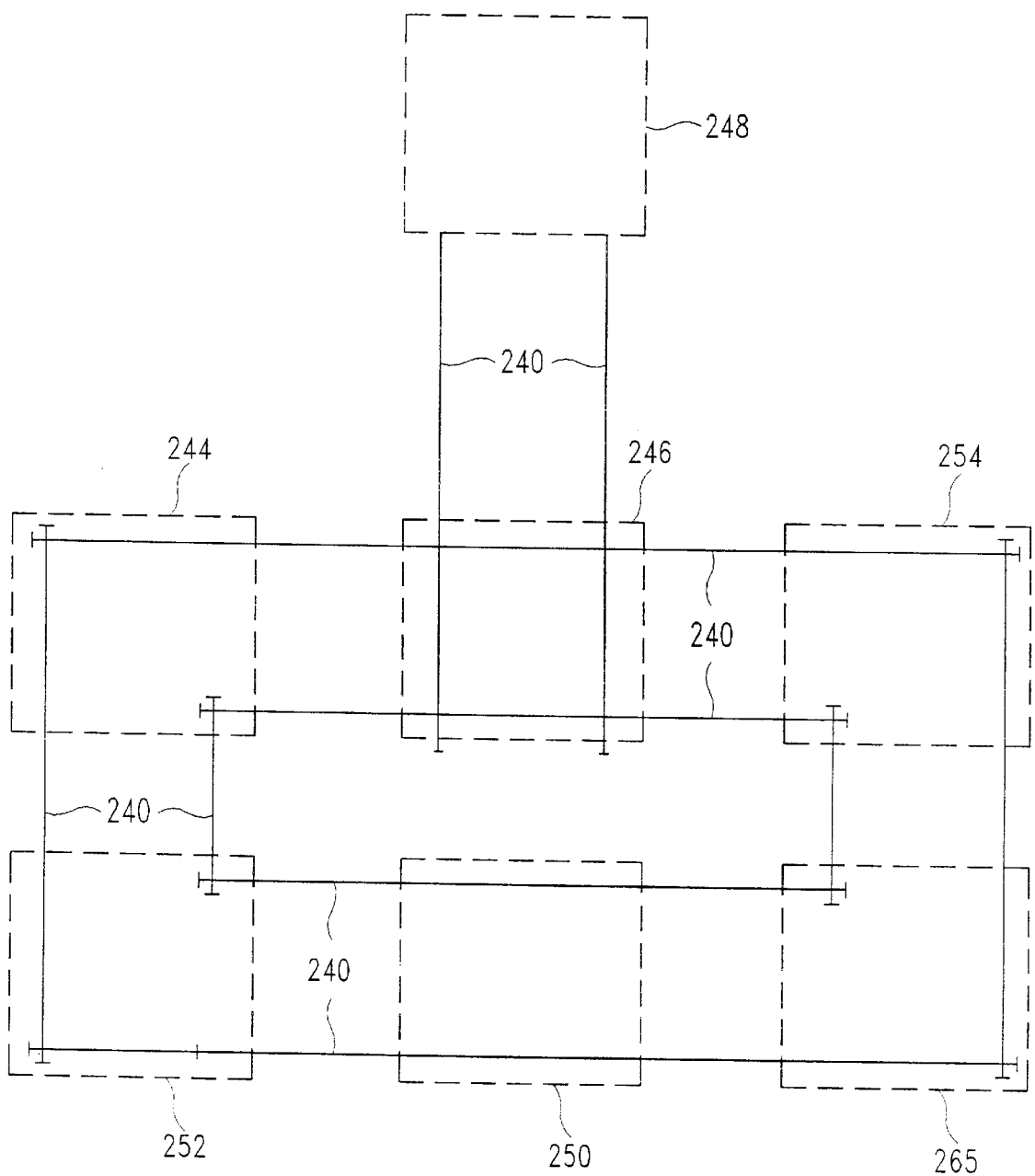
FIG. 21 is a top view of the track layout for one embodiment of the apparatus of FIG. 20.

FIG. 20 is a flow chart of the process of the invention for forming molded articles from particulate thermoplastic material. The process comprises providing a track 240, as shown schematically in FIG. 21, having a plurality of process stations, and, as shown in FIG. 22, providing a mold assembly 242, comprising a base, at least one hollow mold upstanding from the base, and guide means on the base for moving the mold assembly 242 on the track 240. The mold used may be male, female or both male and female. The mold assembly 242 is first preheated at a preheat station 244 on the track 240, after which the mold assembly is moved from the preheat station 244 to a transfer station 246 on the track 240. The mold assembly 242 is then transferred from the transfer station 246 to a molding station 248, where molded articles are formed by fusing particulate thermoplastic material to the mold. Next, the mold assembly 242 is transferred with the molded articles thereon from the molding station 248 back to the transfer station 246, from which the mold assembly 242 is moved to a cooling station 250 on the track 240. The mold assembly 242 is subsequently moved from the cooling station 250 to an unloading station 252 on the track 240. The molded articles are removed from the mold at the unloading station 252. The mold assembly 242 is then moved from the unloading station 252, back to the preheat station 244.

Figure 23:
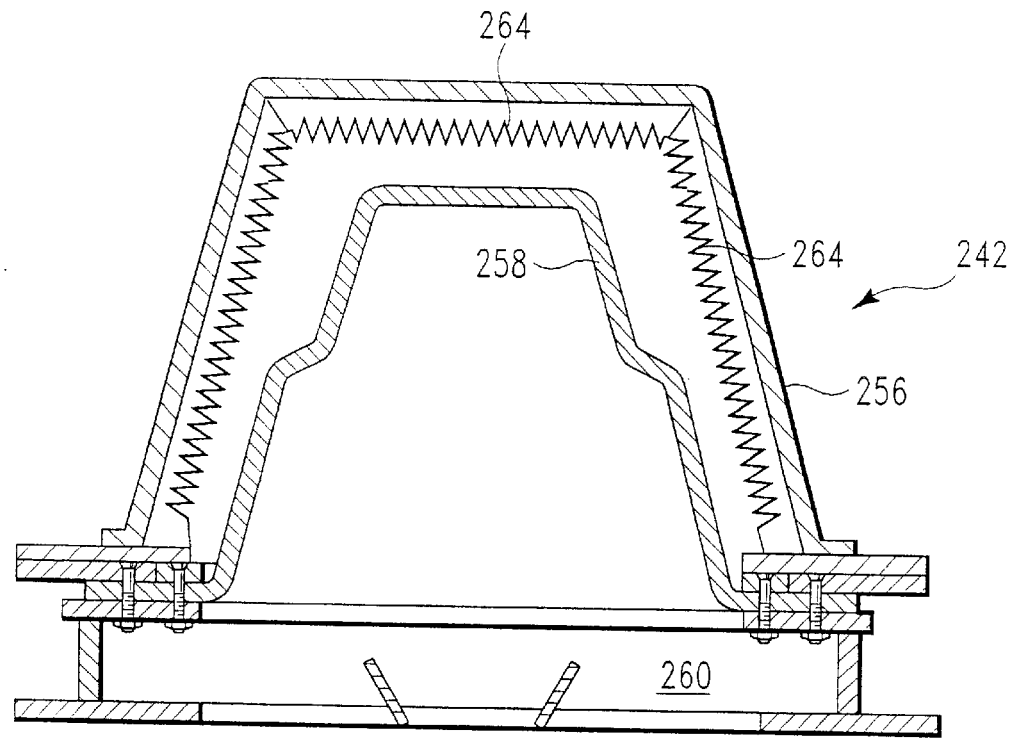
FIG. 23 is a cross-sectional view of a mold assembly inserted in an enclosure which is inserted in a container.

In a variation of the process, the mold assembly 242 with the molded articles thereon is moved from the transfer station 246 to a fusing station 254 on the track 240, the fusing station 254 being located between the transfer station 246 and the cooling station 250. Then the mold 258 on the assembly 242 is heated at the fusing station 254 to further fuse the molded articles on the at least one mold 258. An impactor 300 may be optionally employed in order to shake off all loose powder, resulting in a better finish on the non-mold-side of the product. As shown in FIG. 23, the heating of the mold 258 of the mold assembly 242 with the molded articles thereon at the fusing station 254 comprises placing an enclosure 256 over the mold 258 upstanding from the base 260 of the mold assembly 242, and heating the molded articles by means of heating means 264 in the enclosure. As shown schematically in FIG. 23, the heating means may be a radiant electrical element 264 that surrounds the mold 258.

If desired, the automated process may comprise an auxiliary cooling station 265. This allows the mold assembly to be cooled at a slower rate for a longer period, thus relieving any stresses which may occur in the molded article.

In another variation, illustrated in FIG. 22, forming the molded articles comprises rotating the mold assembly 242 about a horizontal axis to a sideways position at the molding station 248, and clamping the base 260 to an open container 266 containing particulate thermoplastic material so that the base 260 closes the container 266. Then the mold assembly 242 and the container 266 are rotated as a unit to an upright position. Heating the hollow mold 258 from below fuses the particulate material to the mold to form at least one molded article. The unit is rotated back to a sideways position; the container 266 is removed from the mold assembly 242; and the mold assembly and the molded articles are rotated back to an upright position. Subsequent to removing the container 266 from the mold assembly 242 and prior to rotating the mold assembly 242 to an upright position, an enclosure 268 may be inserted into the open container 266, the enclosure 268 having an open end, the base 260 clamped to the open container 266 so that at least one hollow mold is received in the open end of the enclosure 268 and the base 260 closes the container 266. The mold assembly 242, the enclosure 268, and the base 260 as a unit are then rotated to an upside down position. The molded articles are heated by means of heating means 270 in the enclosure 268 in order to further fuse the molded articles on at least one mold. Afterwards, the mold assembly 242, the enclosure 268, and the base 260 are rotated as a unit back to a sideways position, and the container 266 and the enclosure 268 are removed from the mold assembly 242. Optional elements 300 to 303 are described below.

Another embodiment of the invention comprises providing a mold assembly 242 having a base 260 and at least one hollow mold 258 upstanding from the base 260, placing particulate thermoplastic material against the mold 258, heating the mold 258 from inside so that particulate material fuses to the mold 258 to form at least one molded article, and heating the molded article outside in order to further fuse the article.

Figure 24:
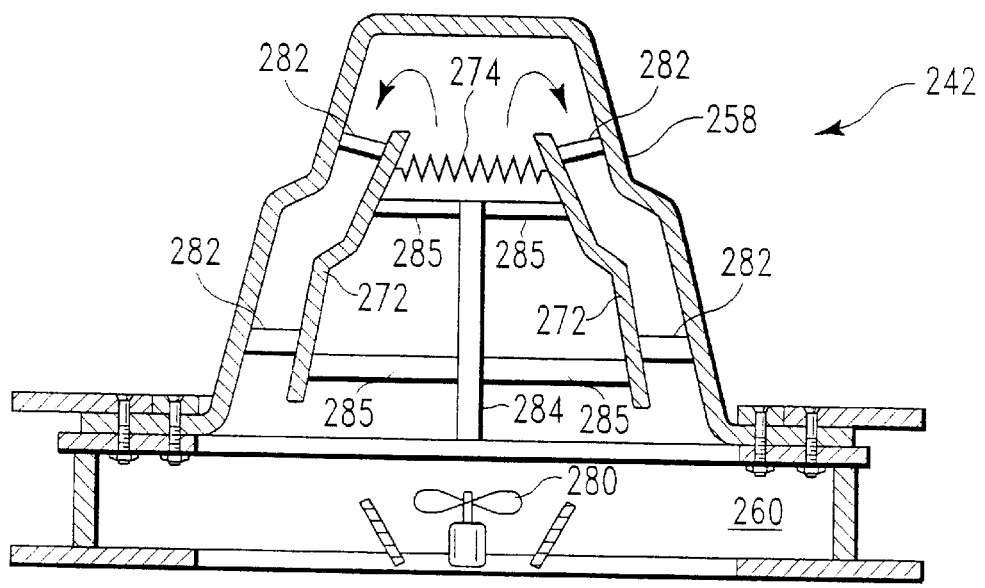
FIG. 24 is a cross-sectional view of a mold assembly containing heating elements and baffles.

The invention also encompasses a mold assembly 242 for forming molded articles from particulate thermoplastic material. As shown in FIG. 24, the assembly comprises a mold 258 having an open end, a closed end, and a surrounding wall extending between the ends, the wall having a baffle 272 extending into the mold 258 from the open end substantially concentrically with the surrounding wall, the baffle being spaced from the closed end, a fan 280 for introducing hot air into the baffle 272 so that the hot air flows between the baffle 272 and the surrounding wall, and a radiant heating element 274 inside the mold between the baffle and the closed end. The mold assembly 242 may have a central frame member extending through the baffle, the frame member supporting the baffle and the radiant heating element.

Figure 25A:
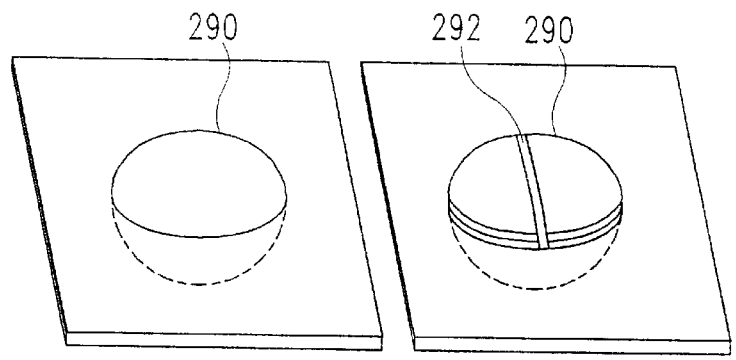
FIG. 25A is a top perspective view of a mold assembly having molds for two halves of a product.
Figure 25B:
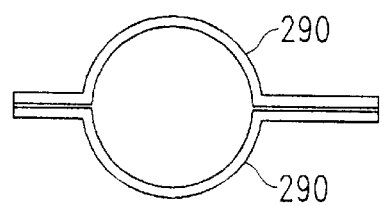
FIG. 25B is a side cross-sectional view of the mold assembly shown in FIG. 25A with one of the molds inverted over the other in order to join the two halves of a product.

As shown in FIGS. 25A and 25B, the invention also encompasses a process for manufacturing a hollow plastic member, the process comprising:

(a) providing a pair of molds 290 having concave molding surfaces which each correspond to half of the plastic member to be molded, (b) placing particulate thermoplastic material against the molding surfaces, (c) heating the molds, as shown in the other FIGS., in order to fuse the particulate thermoplastic material to form respective halves of the plastic member, (d) removing unfused particulate thermoplastic material from the halves at the plastic member, and (e) as shown in FIG. 25B, placing the molds together while the halves are still soft in order to fuse the halves together to form the hollow plastic member.

Subsequent to removing unfused thermoplastic particulate material in step (d) and prior to placing the molds together in step (e), reinforcing inserts 292 may be pressed into at least one of the halves of the plastic member.

The molded parts produced by the process of the invention can be reinforced in the process. When the molding and fuse out is complete and the part is at the cooling station or at a separate station prior to the cooling station, additional heat and fusion is continued instead of turning on the fans. At that point, an open mold faces the operator, and reinforcement (fiberglass, Kevlar, Spectra, screening, netting, foam, metal, wood, honeycomb, etc.) can be inserted onto or into the fusing part. The part can then be left as reinforced or a second skin can be applied either by re-entering the machine to mold over the reinforcement or by taking a previously molded part and fusing it before cooling. In some cases, where difficult shapes are required or when a finished surface on the non-mold side of the molded part is desired, a secondary finishing mold can be used to press the part together or to supply the finished surface on the non-mold side of the part.

In a further variation of the process, the mold is surrounded with particulate thermoplastic material; heat is applied to the mold until the temperature of the outer surface of the mold is above the fusion temperature and below the melting temperature of the particulate thermoplastic material, so as to form a molded article on the outer surface of the mold; excess particulate material is removed from the molded article; heat is applied to the interior of the mold so as to cause the outer surface of the molded article to become smoother; the molded article is cooled subsequent to the fourth stage; and the molded article is removed from the mold. Vibrational energy may be applied to the mold to cause the material to surround the mold before heat is applied to it. The vibrational energy may be provided by mechanical or sonic means.

In further variations of the process of the invention, impactors, vacuum, pressure, secondary fuse out, a secondary outer heat source, or combinations thereof may be used:

1. Impactors

As schematically illustrated in FIG. 22, these impactor units 300 may have flat metal rods that move back and forth impacting a plate on or in the environmental chamber, e.g., the molding station 248. As schematically illustrated in FIG. 23, they may activate in the fuse out position 254 to enhance the shake off of all loose powder resulting in a better product finish of the non-mold-side.

As schematically illustrated in FIG. 22, the process can be carried out utilizing vacuum 301, which helps to eliminate air bubbles and improves strength in the molded product. Evacuating a vibrational mold before making a part is a simple way to achieve faster cure times and improved molded part properties. Therefore, switching from the standard "vented" process in favor of a vibrational vacuum process is beneficial. Vacuum hastens part densification during processing, leaving fewer air voids in the part and thereby enhancing mechanical properties. The vibration may be provided by vibrator 303. Tests to date yielded shorter cycle times and a boost in low-temperature impact strength.

Often in molded parts surface bubbles will appear in the finished part due to entrapment of air between the plastic and the finished part. In injection molding means are used to provide a vent to remove excess air. In the molding process of the invention, drawing a slight vacuum will tend to remove air bubbles and provide a smoother finish.

Moreover, the vacuum-molded parts retain their improved properties even with continued heating after they reach maximum cure. This may make it possible to co-mold materials having dissimilar melting points without material degradation. It is likely that less oxygen exposure may reduce resin oxidation, which may also contribute to the benefits.

Molding cycle times are affected by how long it takes to eliminate air bubbles formed during the heating cycle. The part wall generally takes about half the heating cycle to form completely. The rest of the heating time is required to diffuse air bubbles trapped between the resin particles as they fuse. The presence of bubbles indicates an "uncured" condition. A part is considered adequately cured when no more bubbles are present. The air does not leave the part but rather appears to diffuse into the melt.

3. Pressure

As schematically illustrated in FIG. 22, utilizing pressure 302 in the vibration molding process can increase densification but also is important in composite fusion. The pressure will tend to force particles into voids and where a laminate material is to be fused to the molded plastic, and adhesion is enhanced due to increased contact pressure.

In addition to normal chamber pressure, a unique means of attaining more pressure is to use a heavy blanket (lead, silicone, etc.) and lay the blanket over the fusing part.

Means may be provided in the process at the fuse out station or separately to press the mold downward into the plastic rather than have the plastic cover the mold. In this downward pressing of the mold, the plastic moves around the mold—this movement is enhanced by vibration. If powders are used, this differs from powder coating in that powder coating remains on the part, whereas in molding the part is removed from the mold.

4. Secondary Fuse Out

As illustrated in FIG. 22, After fuse out in the machine, when the mold is removed from the chamber, heat and vibration are applied prior to cooling. This results in a secondary fuse out with the mold in a vertical (not inverted) position. This gives further improvement to the finish on the non-mold surface.

5. Secondary Outer Heat Source

Figure 26:
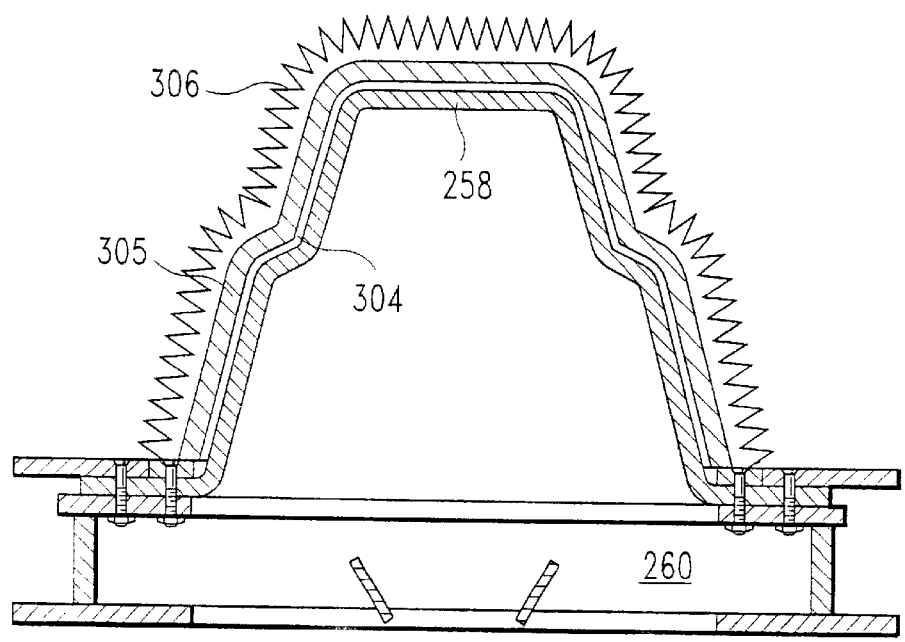
FIG. 26 is a cross-sectional view of a mold assembly with the molded part on it covered by another mold, which is in turn covered by a heating element.

Some products require a finished shape on the non-mold surface different from the result produced by the processing mold. FIG. 26 is a cross-sectional view of a mold 258 with the molded part 304 on it covered by another mold 305, which is in turn covered by an electrical resistance heating element 306. The outer mold 305 and heating element can be placed over the molded part 304 in the unload position 252 to form an outer surface as required by the product design. This technique can also be used with insulating plastics to provide a fused finish on both sides of the part produced.

A conveyor system described in in U.S. Pat. No. 4,431,397 is feasible for the process so long as each step of the operation requires identical time. In the track system of the invention by various means, such as having one vacant position, each operation can be developed in such a way as to allow increased time in any one position. Also the track system allows the loading operator to unload as well, whereas the conveyer system would require a return line.

Higher processing speeds are possible in the process of the invention compared to the process described in U.S. Pat. No. 4,431,397. The original system called for all operations in one position thus: loading, pre-heating, molding, fuse out, cooling, and un-load were sequential in the process of the patent. However, by separating these functions into separate stations, production rate is substantially enhanced. Because each function is now separate, beneficial mechanisms and abilities can be added to each position. For example, specialized pre-heated elements for faster pre-heat at optimized cost may be used. In addition, specialized heating assists connections to increase localized heat and to provide directed material build-up where part design requires thicker sections. Specialized impactors at the fuse out station remove excess unmolded material. Specialized mechanical and air connectors may be used for automatic ejection.

The process has enabled production of parts either difficult or impossible to produce by other means. Examples are:
multi-pocket containers for automotive struts with no draft using low cost molds;
fused on or in bolts or inserts by fusing in or on
Insert molding is available by other processes but fused on after molding is unique to the process of the invention.

While there have been described what are believed to be the preferred embodiments of the present invention, those skilled in the art will recognize that various changes and modifications may be made thereto without departing from the spirit of the invention, and it is intended to claim all such embodiments as fall within the true scope of the invention.

What is claimed is:

1. A process for forming molded articles from particulate thermoplastic material, the process comprising:
    (a) providing a track having a plurality of process stations including preheat station, a transfer station, a molding station, a fusing station, a cooling station and an unloading station,
    (b) providing a mold assembly comprising a base, at least one hollow mold on the base, and guide means on the base for moving the mold assembly on the track,
    (c) preheating the mold assembly at a preheat station on the track,
    (d) moving the mold assembly from the preheat station to a transfer station on the track,
    (e) transferring the mold assembly from the transfer station to a molding station,
    (f) placing the mold assembly in a container holding particulate plastic material,
    (g) forming the molded articles by fusing the particulate material to the at least one mold at the molding station, comprising the steps of:
        (g-1) rotating the mold assembly about a horizontal axis to a sideways position at the molding station,
        (g-2) clamping the base to an open container containing particulate thermoplastic material so that the base closes the container,
        (g-3) rotating the mold assembly and the container as a unit to an upright position,
        (g-4) heating the hollow molds from below so that the particulate material fuses to the at least one mold to form at least one molded article,
        (g-5) rotating the unit back to a sideways position,
        (g-6) removing the container from the mold assembly,
        (g-7) inserting an enclosure into the open container, the enclosure having an open end,
        (g-8) clamping the base to the open container so that the at least one hollow mold is received in the open end of the enclosure and the base closes the container,
        (g-9) rotating the mold assembly, the enclosure, and the base as a unit to an upside down position,
        (g-10) heating the molded articles by means of heating means in the enclosure in order to further fuse the molded articles on the at least one mold, and
        (g-11) rotating the mold assembly, the enclosure, and the base as a unit back to a sideways position,
        (g-12) removing the container and the enclosure from the mold assembly, and
        (g-13) rotating the mold assembly with the molded articles back to an upright position,
    (h) transferring the mold assembly with the molded articles thereon from the molding station back to the transfer station,
    (i) moving the mold assembly from the transfer station to a fusing station on the track,
    (j) placing an enclosure over the mold assembly,
    (k) heating the mold assembly in the enclosure at the fusing station to further fuse the molded articles on the at least one mold,
    (l) moving the mold assembly from the fusing station to a cooling station on the track, (m) moving the mold assembly from the cooling station to an unloading station on the track, (n) removing the molded articles from the at least one mold at the unloading station, and (o) moving the mold assembly from the unloading station to the preheat station.

2. A process as claimed in claim 1, wherein an impactor is used to move back and forth impacting a plate on or in the mold assembly while said mold assembly is in at least one of the molding station and the fusion station.

3. A process as claimed in claim 1, wherein the process is carried out utilizing vacuum, in order to minimize or eliminate air bubbles and improves strength in the molded product.

4. A process as claimed in claim 1, wherein pressure is used in a vibration molding process in order to increase densification.

5. A process as claimed in claim 1, wherein heat and vibration are applied to the mold assembly while said mold assembly is in at least one of the molding station and the fusing station.

6. A process as claimed in claim 1, wherein an outer mold and heat source are placed over the molded part in the unload position in order to form a desired outer surface.

7. A process for forming molded articles as claimed in claim 1, wherein the mold is a male mold.

* * * * *